US012668055B2

(12) United States Patent
Kawakami et al.

(10) Patent No.: US 12,668,055 B2
(45) Date of Patent: Jun. 30, 2026

(54) LIQUID EJECTION APPARATUS AND FAILURE DIAGNOSTIC METHOD FOR HEAD UNIT

(71) Applicant: SEIKO EPSON CORPORATION, Tokyo (JP)

(72) Inventors: Masayuki Kawakami, Matsumoto (JP); Yasuhiko Kosugi, Matsumoto (JP); Tomohiro Matsubayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 151 days.

(21) Appl. No.: 18/679,561

(22) Filed: May 31, 2024

(65) Prior Publication Data

US 2024/0399737 A1 Dec. 5, 2024

(30) Foreign Application Priority Data

Jun. 2, 2023 (JP) ................................ 2023-091667

(51) Int. Cl.
*B41J 2/045* (2006.01)

(52) U.S. Cl.
CPC ......... *B41J 2/0451* (2013.01); *B41J 2/04563* (2013.01); *B41J 2/04581* (2013.01)

(58) Field of Classification Search
CPC .... B41J 2/14201; B41J 2/14233; B41J 2/161; B41J 2/1635; B41J 2/01; B41J 2/1607; B41J 2/14209; B41J 2/14274; B41J 2/14282; B41J 2/1429; B41J 2/14298; B41J 2002/14217; B41J 2002/14225; B41J 2002/14241; B41J 2002/1425; B41J 2002/14266
See application file for complete search history.

(56) References Cited

U.S. PATENT DOCUMENTS

2022/0258472 A1 8/2022 Hirai et al.
2024/0109293 A1* 4/2024 Ito ........................ B41J 2/04596 347/10

FOREIGN PATENT DOCUMENTS

JP 2022-124599 A 8/2022

* cited by examiner

*Primary Examiner* — Kristal Feggins
(74) *Attorney, Agent, or Firm* — Spencer Fane LLP

(57) ABSTRACT

A liquid ejection apparatus includes a first print head receiving a drive signal and ejecting a liquid, a temperature information output circuit acquiring a first temperature signal indicating a temperature of the first print head and outputting a temperature information signal, and a state determination circuit determining a state of the print head based on the temperature information signal, wherein the first print head includes a first temperature detection unit outputting the first temperature signal, and the state determination circuit determines that the liquid stored in a first pressure chamber is short when the temperature of the first pressure chamber corresponding to the first temperature signal exceeds a first predetermined value, and determines that the liquid stored in the first pressure chamber is not short when the temperature of the first pressure chamber corresponding to the first temperature signal does not exceed the first predetermined value.

10 Claims, 7 Drawing Sheets

LIQUID EJECTION APPARATUS AND FAILURE DIAGNOSTIC METHOD FOR HEAD UNIT

The present application is based on, and claims priority from JP Application Serial Number 2023-091667, filed Jun. 2, 2023, the disclosure of which is hereby incorporated by reference herein in its entirety.

BACKGROUND

1. Technical Field

The present disclosure relates to a liquid ejection apparatus and a failure diagnostic method for a head unit.

2. Related Art

JP-A-2022-124599 discloses a liquid ejection apparatus including a liquid ejection head having a piezoelectric element, a pressure chamber, and a nozzle communicating with the pressure chamber, and ejecting a liquid supplied to the pressure chamber from the nozzle by driving the piezoelectric element to change a volume of the pressure chamber.

JP-A-2022-124599 is an example of the related art.

However, from the viewpoint of further enhancing the reliability of the liquid ejection apparatus that ejects the liquid, the technique disclosed in JP-A-2022-124599 alone is not sufficient, and there is room for improvement.

SUMMARY

A liquid ejection apparatus according to an aspect of the present disclosure includes a drive circuit outputting a drive signal corrected based on a temperature information signal, a first print head receiving the drive signal and ejecting a liquid, a temperature information output circuit acquiring a first temperature signal indicating a temperature of the first print head and outputting the temperature information signal based on the first temperature signal, and a state determination circuit determining a state of the first print head based on the temperature information signal, wherein the first print head includes a first piezoelectric element including a first electrode, a second electrode, and a first piezoelectric material, the first piezoelectric material being positioned between the first electrode and the second electrode in a first stacking direction in which the first electrode, the second electrode, and the first piezoelectric material are stacked, and receiving the drive signal and being driven, a first vibrating plate located at one side in the first stacking direction with respect to the first piezoelectric element and deformed by driving of the first piezoelectric element, and a first pressure chamber substrate provided with a first pressure chamber located at one side in the first stacking direction with respect to the first vibrating plate, storing the liquid, and having a volume that changes by deformation of the first vibrating plate, a first nozzle ejecting the liquid according to a change of the volume of the first pressure chamber, and a first temperature detection unit located at the other side in the first stacking direction with respect to the first vibrating plate, acquiring first temperature information corresponding to a temperature of the first pressure chamber, and outputting the information as the first temperature signal, and the state determination circuit determines that the liquid stored in the first pressure chamber is short when the temperature of the first pressure chamber corresponding to the first temperature signal exceeds a first predetermined value, and determines that the liquid stored in the first pressure chamber is not short when the temperature of the first pressure chamber corresponding to the first temperature signal does not exceed the first predetermined value.

A failure diagnostic method for a head unit according to an aspect of the present disclosure is a failure diagnostic method for a head unit including a first print head having a first piezoelectric element including a first electrode, a second electrode, and a first piezoelectric material, the first piezoelectric material being positioned between the first electrode and the second electrode in a first stacking direction in which the first electrode, the second electrode, and the first piezoelectric material are stacked, and receiving the drive signal and being driven, a first vibrating plate located at one side in the first stacking direction with respect to the first piezoelectric element and deformed by driving of the first piezoelectric element, and a first pressure chamber substrate provided with a first pressure chamber located at one side in the first stacking direction with respect to the first vibrating plate, storing the liquid, and having a volume that changes by deformation of the first vibrating plate, a first nozzle ejecting the liquid in response to a change of the volume of the first pressure chamber, and a first temperature detection unit located at the other side in the first stacking direction with respect to the first vibrating plate, acquiring first temperature information corresponding to a temperature of the first pressure chamber, and outputting the information as the first temperature signal, including determining that the liquid stored in the first pressure chamber is short when the temperature of the first pressure chamber corresponding to the first temperature signal exceeds a first predetermined value, and determining that the liquid stored in the first pressure chamber is not short when the temperature of the first pressure chamber corresponding to the first temperature signal does not exceed the first predetermined value.

DESCRIPTION OF EMBODIMENTS

As below, preferred embodiments of the present disclosure will be described with reference to the drawings. The drawings to be used are for convenience of explanation. Note that the embodiments to be described below do not unduly limit the present disclosure described in the claims. Further, not all configurations to be described below are necessarily essential component elements of the present disclosure.

1. Structure of Liquid Ejection Apparatus

Structure of Liquid Ejection Apparatus

Figure 1:
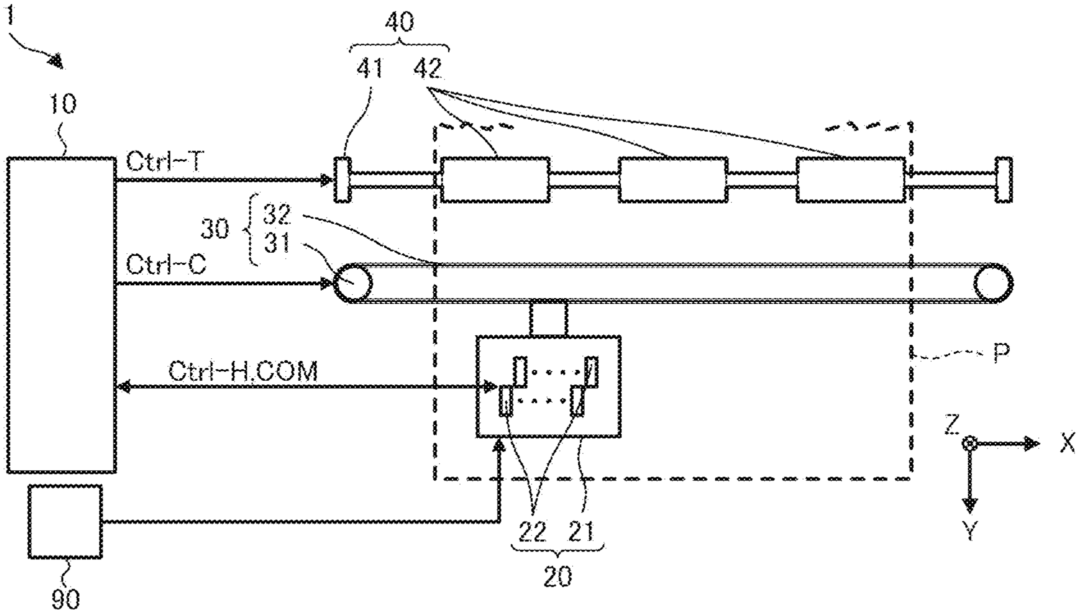
FIG. 1 shows a schematic configuration of a liquid ejection apparatus.

FIG. 1 shows a schematic configuration of a liquid ejection apparatus 1. The liquid ejection apparatus 1 of the embodiment is a so-called serial printing-type inkjet printer in which a carriage 21 mounted with print heads 22 for ejecting inks as an example of liquids reciprocates along a scanning axis and ejects the inks to a medium P transported along a transport direction to form a desired image on the medium P. As the medium P in the liquid ejection apparatus 1, any object to be printed such as printing paper, a resin film, or cloth can be used. The liquid ejection apparatus 1 is not limited to the serial printing-type inkjet printer, but may be a line printing-type inkjet printer. Further, the liquid ejection apparatus 1 is not limited to an inkjet printer, and may be a color material ejection apparatus used for manufacture of a color filter for a liquid crystal display or the like, an electrode material ejection apparatus used for formation of an electrode for an organic EL display, an FED (field emission display), or the like, a bioorganic material ejection apparatus used for manufacture of a biochip, a three-dimensional modeling apparatus, a textile printing apparatus, or the like.

In the following description, an X-axis, a Y-axis, and a Z-axis as three spatial axes orthogonal to one another are used. Further, in the following description, when orientations of directions along the X-axis, the Y-axis, and the Z-axis are specified, a pointer side of an arrow indicating the direction along the X-axis shown in the drawing is referred to as "+X side" and a tail side is referred to as "−X side", a pointer side of an arrow indicating the direction along the Y-axis shown in the drawing is referred to as "+Y side" and a tail side is referred to as "−Y side", and a pointer side of an arrow indicating the direction along the Z-axis shown in the drawing is referred to as "+Z side" and a tail side is referred to as "−Z side".

As shown in FIG. 1, the liquid ejection apparatus 1 includes a control unit 10, a head unit 20, a movement unit 30, a transport unit 40, and an ink container 90.

The ink container 90 stores a plurality of types of inks to be ejected onto the medium P. As the ink container 90 storing the inks, an ink cartridge, a bag-shaped ink pack formed of a flexible film, an ink tank in which the inks can be replenished, or the like can be used.

The control unit 10 includes a processing circuit such as a CPU (Central Processing Unit) or an FPGA (Field Programmable Gate Array) and a memory circuit such as a semiconductor memory, and controls the respective elements of the liquid ejection apparatus 1 including the head unit 20.

The head unit 20 includes the carriage 21 and the plurality of print heads 22. The carriage 21 is fixed to an endless belt 32 provided in the movement unit 30 to be described later. The plurality of print heads 22 are mounted on the carriage 21. A control signal Ctrl-H and a drive signal COM output by the control unit 10 are input to each of the plurality of print heads 22. Further, the ink stored in the ink container 90 is supplied to each of the plurality of print heads 22 via a tube or the like (not shown). The print head 22 ejects the ink supplied from the ink container 90 based on the input control signal Ctrl-H and drive signal COM. Here, a direction along the Z-axis in which the print head 22 ejects the ink from the −Z side to the +Z side along the Z-axis may be referred to as an ejection direction.

The movement unit 30 includes a carriage motor 31 and the endless belt 32. The carriage motor 31 operates based on a control signal Ctrl-C input from the control unit 10. The endless belt 32 extends along the X-axis and rotates according to the operation of the carriage motor 31. Thereby, the carriage 21 fixed to the endless belt 32 moves along the X-axis. That is, the movement unit 30 reciprocates the plurality of print heads 22 mounted on the carriage 21 along the X-axis. In the following description, directions along the X-axis in which the plurality of print heads 22 mounted on the carriage 21 move may be referred to as scanning directions.

The transport unit 40 includes a transport motor 41 and transport rollers 42. The transport motor 41 operates based on a control signal Ctrl-T input from the control unit 10. The transport rollers 42 rotate according to the operation of the transport motor 41 with the medium P nipped. Thereby, the medium P nipped by the transport rollers 42 is transported from the −Y side to the +Y side along the Y-axis. That is, the transport unit 40 transports the medium P from the −Y side to the +Y side along the Y-axis. In the following description, a direction from the −Y side toward the +Y side in which the medium P is transported may be referred to as a transport direction.

In the liquid ejection apparatus 1 having the above described configuration, the movement unit 30 controls the reciprocating movement of the carriage 21 along the scanning direction, and the transport unit 40 controls the transport of the medium P in the direction along the transport direction. The print heads 22 mounted on the carriage 21 eject the inks in conjunction with the reciprocating movement of the carriage 21 along the scanning direction and the transport of the medium P in the transport direction. As a result, the inks ejected by the print heads 22 may be landed on any surface of the medium P, and a desired image is formed on the medium P.

Structure of Ejection Module

Figure 2:
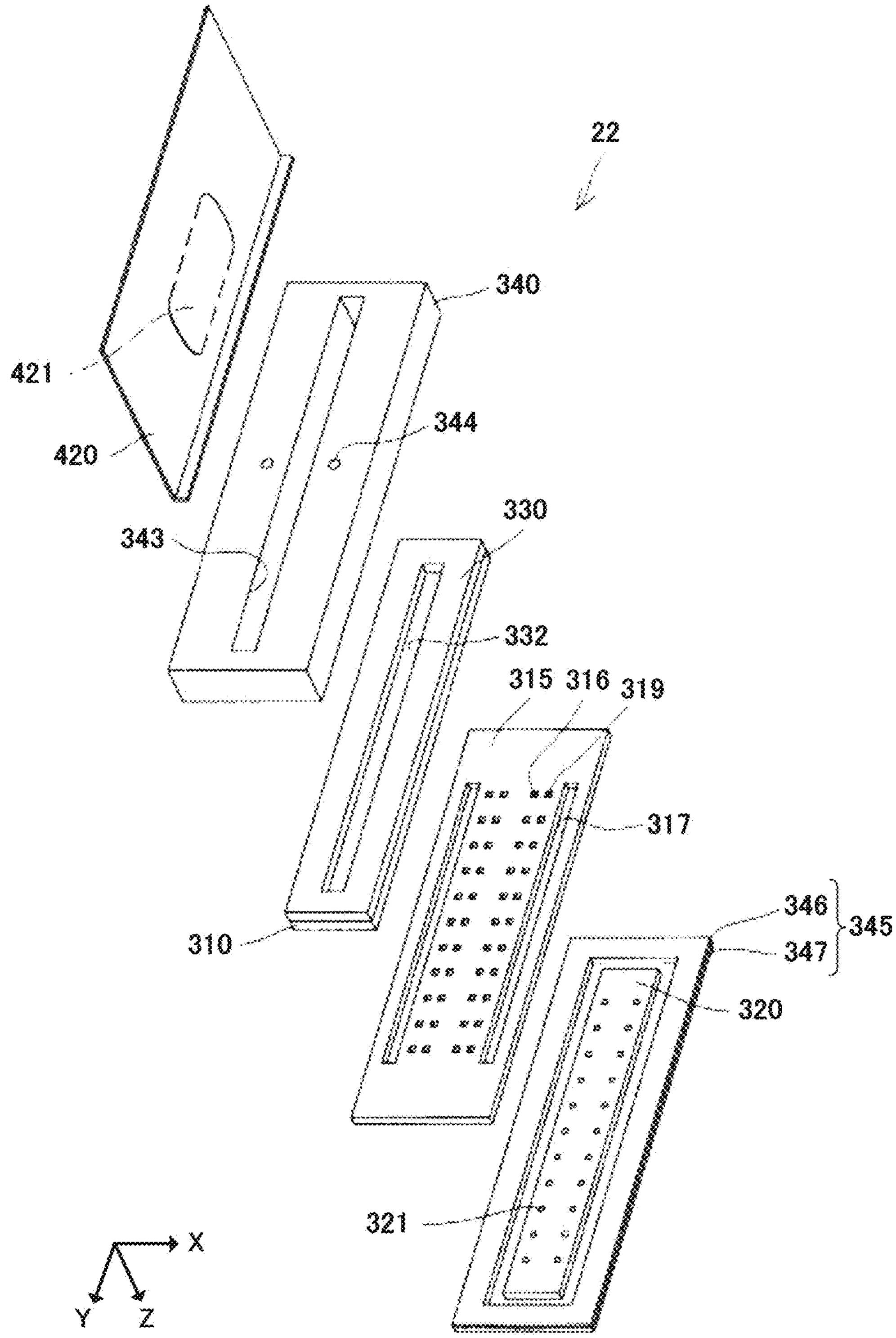
FIG. 2 is an exploded perspective view showing a structure of a print head.
Figure 3:
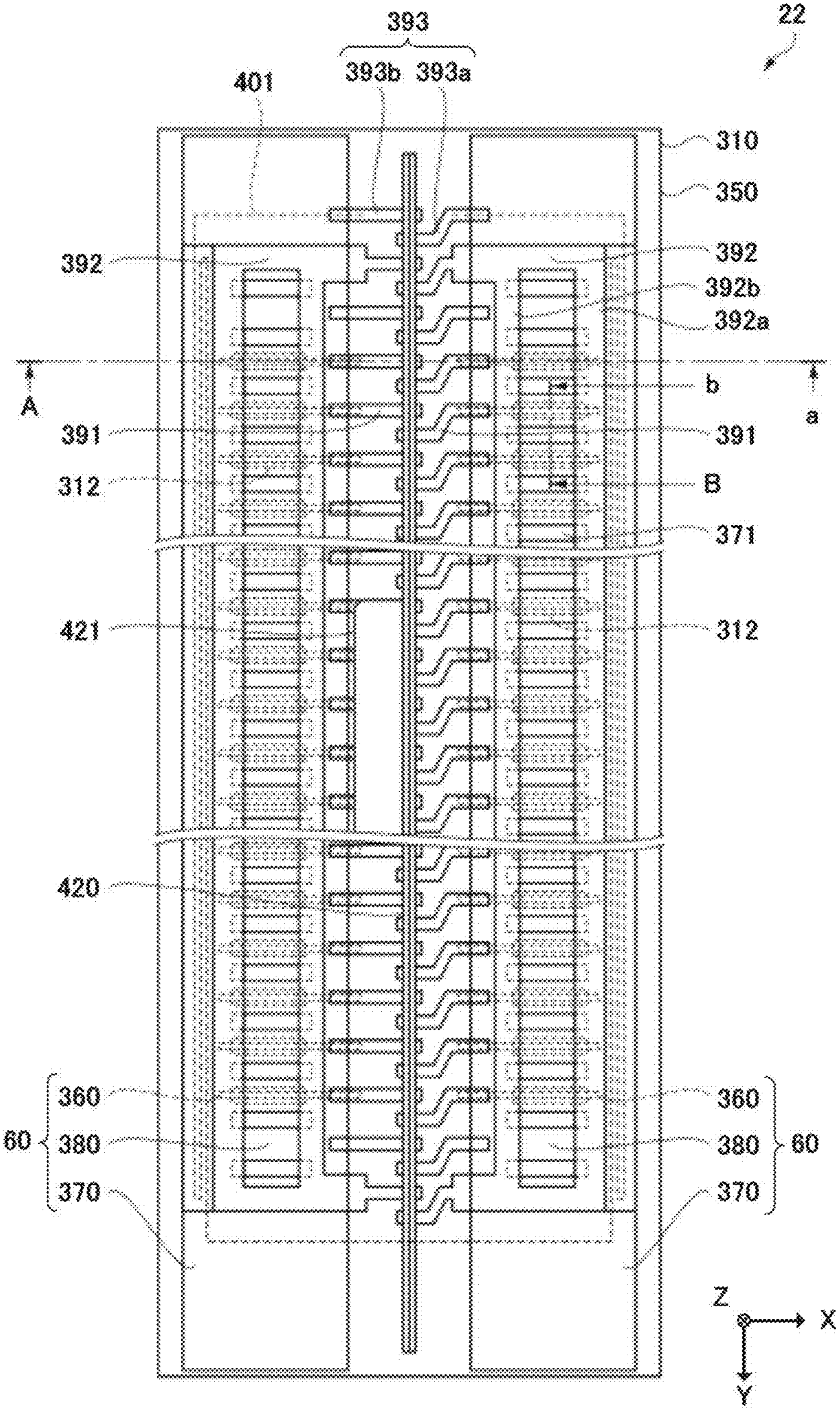
FIG. 3 is a plan view of the print head as seen along a Z-axis.
Figure 4:
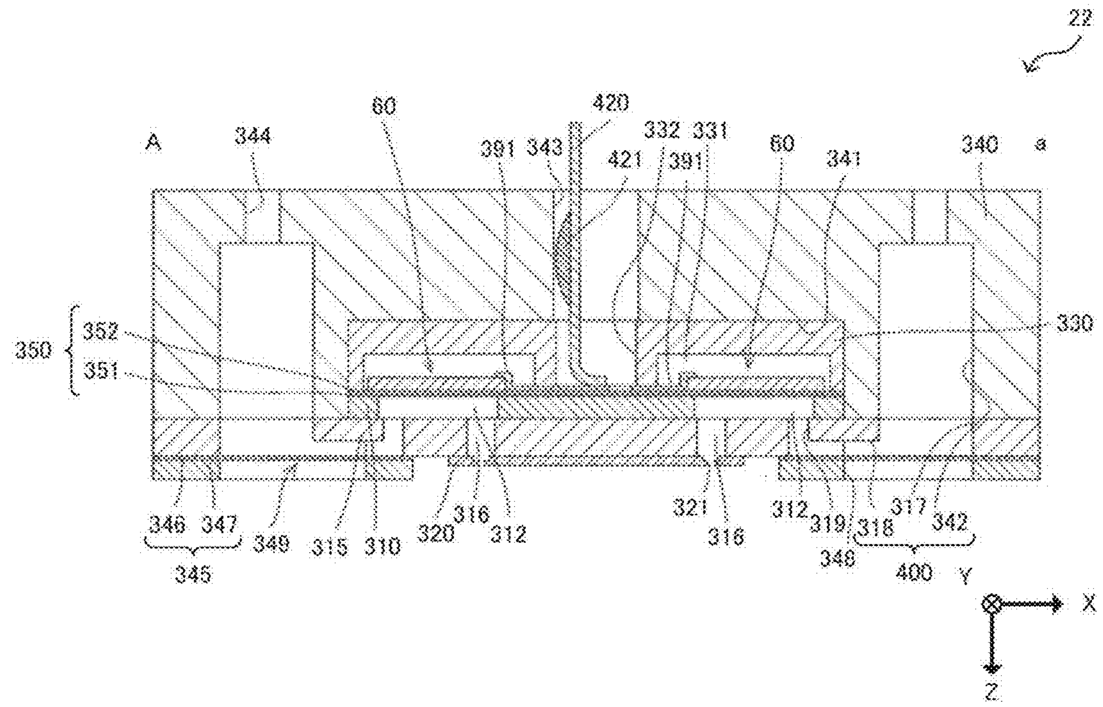
FIG. 4 is a cross-sectional view showing an A-a cross section shown in FIG. 3.
Figure 5:
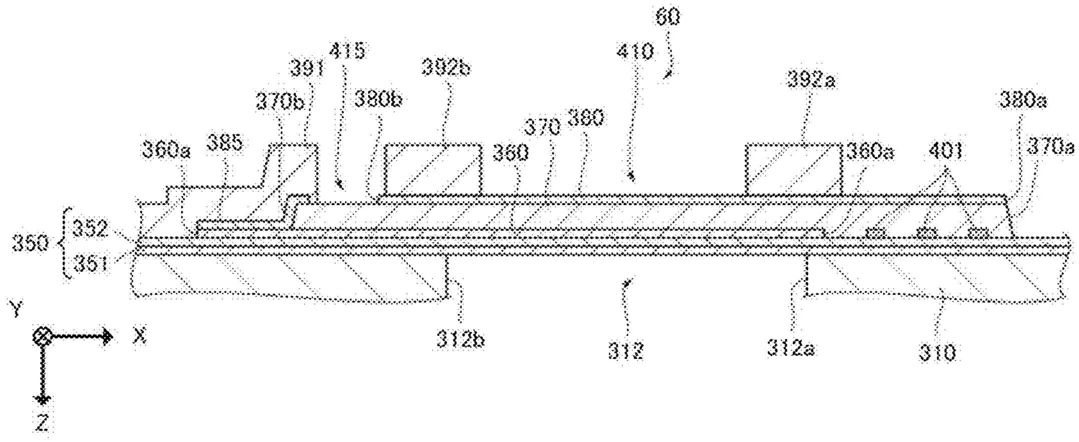
FIG. 5 is a main part detailed view showing details of a main part of FIG. 4.
Figure 6:
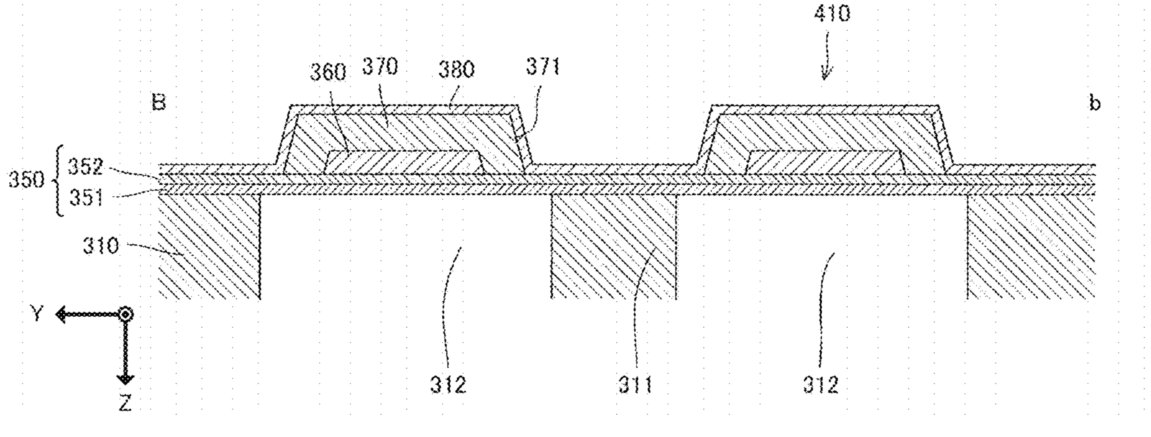
FIG. 6 is a cross-sectional view showing a B-b cross section shown in FIG. 3.

Next, an example of a structure of the print head 22 of the head unit 20 will be described. FIG. 2 is an exploded perspective view showing the structure of the print head 22, FIG. 3 is a plan view of the print head 22 as seen along the Z-axis, FIG. 4 is a cross-sectional view showing an A-a cross section shown in FIG. 3, FIG. 5 is a main part detailed view showing details of a main part of FIG. 4, and FIG. 6 is a cross-sectional view showing a B-b cross section shown in FIG. 3.

As shown in FIG. 2, the print head 22 has a pressure chamber substrate 310, a communicating plate 315, a nozzle plate 320, a compliance substrate 345, a vibrating plate 350 to be described later, piezoelectric elements 60 to be described later, a protective substrate 330, a case member 340, and a wiring substrate 420.

The pressure chamber substrate 310 includes, for example, a silicon substrate, a glass substrate, an SOI substrate, and various ceramic substrates. As shown in FIG. 3, in the pressure chamber substrate 310, two pressure chamber rows in which the plurality of pressure chambers 312 are placed along the Y-axis are arranged along the X-axis. Here, of the two pressure chamber rows, the pressure chamber row located at the +X side may be referred to as a first pressure chamber row, and the pressure chamber row located at the −X side of the first pressure chamber row may be referred to as a second pressure chamber row. FIG. 3 is the plan view of the print head 22 as seen along the Z-axis, in which the peripheral configuration of the pressure chamber substrate 310 is illustrated but the illustration of the protective substrate 330, the case member 340, and the like is omitted.

The plurality of pressure chambers 312 forming each pressure chamber row are disposed on a straight line along the Y-axis so that the positions along the X-axis are the same. The pressure chambers 312 adjacent to each other along the Y-axis are partitioned by a partition wall 311 shown in FIG. 6. Obviously, the arrangement of the pressure chambers 312 is not particularly limited. For example, the arrangement of the plurality of pressure chambers 312 along the Y-axis may be a so-called staggered arrangement in which the pressure chambers 312 are alternately shifted in the direction along the X-axis.

Further, the pressure chamber 312 of the embodiment is formed in a so-called rectangular shape in which the length in the direction along the X-axis is longer than the length in the direction along the Y-axis in plain view seen from the +Z side. Obviously, the shape of the pressure chamber 312 in the plan view from the +Z side is not limited to the rectangular shape, but may be a parallelogram shape, a polygonal shape, a circular shape, an oval shape, or the like. Here, the oval shape refers to a shape formed by shaping of both end portions of a rectangular shape as a base shape in the longitudinal direction to be semicircular, and includes a rounded rectangular shape, an elliptical shape, and an egg shape.

As shown in FIG. 2, the communicating plate 315, the nozzle plate 320, and the compliance substrate 345 are stacked at the +Z side of the pressure chamber substrate 310.

As shown in FIGS. 2, 4, and 5, nozzle communication paths 316 communicating with the pressure chambers 312 and the nozzles 321 are provided in the communicating plate 315. Further, the communicating plate 315 is provided with a first manifold portion 317 and a second manifold portion 318 forming a part of a manifold 400 as a common liquid chamber communicating with the plurality of pressure chambers 312. The first manifold portion 317 is provided to penetrate the communicating plate 315 in the direction along the Z-axis. The second manifold portion 318 is provided not to penetrate the communicating plate 315 in the direction along the Z-axis, but to open in the surface at the +Z side.

Further, in the communicating plate 315, a supply communication path 319 communicating with one end portion of the pressure chamber 312 in the direction along the X-axis is independently provided for each of the pressure chambers 312. The supply communication path 319 communicates with the second manifold portion 318 and each pressure chamber 312, and supplies the ink within the manifold 400 to each pressure chamber 312.

As the communicating plate 315, a silicon substrate, a glass substrate, an SOI substrate, various ceramic substrates, a metal substrate, or the like can be used. Examples of the metal substrate include a stainless steel substrate. The communicating plate 315 is preferably formed using a material having a thermal expansion coefficient substantially equal to that of the pressure chamber substrate 310. Accordingly, even when the temperatures of the pressure chamber substrate 310 and the communicating plate 315 change, the chance that warpage occurs in the pressure chamber substrate 310 and the communicating plate 315 due to a difference in the thermal expansion coefficient can be reduced.

The nozzle plate 320 is provided on the surface of the communicating plate 315 at the side opposite to the pressure chamber substrate 310, that is, at the +Z side. In the nozzle plate 320, the nozzles 321 communicating with the respective pressure chambers 312 via the nozzle communication paths 316 are formed.

In the embodiment, the print head 22 has the plurality of nozzles 321, and the plurality of nozzles 321 are arranged in the direction along the Y-axis direction. Specifically, in the nozzle plate 320, two nozzle rows in which the plurality of nozzles 321 are arranged are provided apart from each other in the direction along the X-axis. These two nozzle rows respectively correspond to the first pressure chamber row and the second pressure chamber row. The plurality of nozzles 321 in the respective rows are arranged so that the positions in the direction along the X-axis are the same. The arrangement of the nozzles 321 is not particularly limited. For example, the nozzles 321 arranged in the direction along the Y-axis may be alternately shifted in the X-axis direction.

The material of the nozzle plate 320 is not particularly limited. For example, a silicon substrate, a glass substrate, an SOI substrate, various ceramic substrates, or a metal substrate can be used. Examples of the metal substrate include a stainless steel substrate. Furthermore, the material of the nozzle plate 320 may be an organic material such as polyimide resin. Note that it is preferable that the material of the nozzle plate 320 has substantially the same thermal expansion coefficient as the communicating plate 315. Thereby, even when the temperatures of the nozzle plate 320 and the communicating plate 315 change, the chance that warpage occurs in the nozzle plate 320 and the communicating plate 315 due to the difference in thermal expansion coefficient can be reduced.

The compliance substrate 345, together with the nozzle plate 320, is provided on the surface of the communicating plate 315 at the side opposite to the pressure chamber substrate 310, that is, at the +Z side. The compliance substrate 345 is provided around the nozzle plate 320, and seals the openings of the first manifold portion 317 and the second manifold portion 318 provided in the communicating plate 315. The compliance substrate 345 includes a sealing film 346 of a flexible thin film and a fixing substrate 347 formed of a hard material including a metal. A region of the fixed substrate 347 facing the manifold 400 is completely removed in the thickness direction to form an opening portion 348. Accordingly, one surface of the manifold 400 is a compliance portion 349 sealed only by the flexible sealing film 346.

On the other hand, on the surface of the pressure chamber substrate 310 at the side opposite to the nozzle plate 320 and the like, that is, at the −Z side, the vibrating plate 350 and the piezoelectric elements 60 that flexurally deform the vibrating plate 350 to cause pressure change in the inks within the pressure chamber 312 are stacked. In other words, the vibrating plate 350 is provided at the +Z side in the direction along the Z-axis with respect to the piezoelectric elements 60, and the pressure chamber substrate 310 is provided at the +Z side in the direction along the Z-axis with respect to the vibrating plate 350. FIG. 4 is a diagram for explanation of the overall configuration of the print head 22, and the configuration of the piezoelectric element 60 is simplified.

Further, the protective substrate 330 having substantially the same size as the pressure chamber substrate 310 is bonded to the −Z side surface of the pressure chamber substrate 310 by an adhesive or the like. The protective substrate 330 has holding portions 331 as spaces for protecting the piezoelectric elements 60. The holding portion 331 is the space provided independently for each row of the piezoelectric elements 60 arranged in the direction along the Y-axis, and the two holding portions 331 are formed in the direction along the X-axis. Further, in the protective substrate 330, a through hole 332 penetrating in the direction along the Z-axis is provided between the two holding portions 331 arranged in the direction along the X-axis.

Furthermore, the case member 340, which defines the manifold 400 communicating with the plurality of pressure chambers 312 together with the pressure chamber substrate 310, is fixed onto the protective substrate 330. The case member 340 has substantially the same shape as the above described communicating plate 315 in the plan view from the −Z side, and is joined to the protective substrate 330 and also joined to the above described communicating plate 315.

The case member 340 has a housing portion 341 as a space deep enough to house the pressure chamber substrate 310 and the protective substrate 330 at the protective substrate 330 side. The housing portion 341 has an opening area larger than the surface of the protective substrate 330 bonded to the pressure chamber substrate 310. With the pressure chamber substrate 310 and the protective substrate 330 housed in the housing portion 341, the opening surface of the housing portion 341 at the nozzle plate 320 side is sealed by the communicating plate 315.

Further, in the case member 340, third manifold portions 342 are defined at the outer sides of the housing portions 341 in the direction along the X-axis. The first manifold portion 317 and the second manifold portion 318 provided in the communicating plate 315 and the third manifold portion 342 form the manifold 400. The manifolds 400 are provided continuously in the direction along the Y-axis, and the supply communication paths 319 that communicate with the respective pressure chambers 312 and the manifolds 400 are arranged in the direction along the Y-axis.

The case member 340 is provided with supply ports 344 that communicate with the manifolds 400 and supplies the inks to the respective manifolds 400. Further, the case member 340 is provided with a connection port 343 that communicates with the through hole 332 of the protective substrate 330, through which the wiring substrate 420 is inserted.

The print head 22 takes in the ink stored in the ink container 90 from the supply port 344. After the inside from the manifold 400 to the nozzles 321 is filled with the ink, a signal based on the drive signal COM is supplied from an integrated circuit 421 to each of the piezoelectric elements 60 corresponding to the pressure chambers 312. Accordingly, the vibrating plate 350 is flexurally deformed together with the piezoelectric element 60, the pressure within each pressure chamber 312 is increased, and the ink is ejected from each nozzle 321.

Next, a configuration including the above described vibrating plate 350 and piezoelectric elements 60 stacked at the −Z side of the pressure chamber substrate 310 will be described. The print head 22 has individual lead electrodes 391, common lead electrodes 392, a measurement lead electrode 393, and a resistance wire 401 as configurations stacked at the −Z side of the pressure chamber substrate 310 in addition to the vibrating plate 350 and the piezoelectric elements 60.

As shown in FIGS. 4 to 6, the vibrating plate 350 includes an elastic film 351 formed of silicon oxide provided at the pressure chamber substrate 310 side, and an insulating film 352 formed of a zirconium oxide film provided on the elastic film 351. The liquid flow channels including the pressure chambers 312 and the like are formed by anisotropic etching of the pressure chamber substrate 310 from the +Z side-surface, and the elastic film 351 forms the −Z side-surfaces of the liquid flow channels including the pressure chambers 312. The configuration of the vibrating plate 350 is not particularly limited. For example, the vibrating plate may include one of the elastic film 351 and the insulating film 352, and may further include another film than the elastic film 351 and the insulating film 352. Here, examples of the material of the other film forming the vibrating plate 350 include silicon and silicon nitride.

The piezoelectric element 60 functions as a piezoelectric actuator that causes a pressure change in the ink within the pressure chamber 312. The piezoelectric element 60 includes an electrode 360, a piezoelectric material 370, and an electrode 380 that are sequentially stacked from the +Z side as the vibrating plate 350-side toward the −Z side. In other words, the piezoelectric element 60 includes the electrode 360, the electrode 380, and the piezoelectric material 370, and the piezoelectric material 370 is provided between the electrode 360 and the electrode 380 in the direction along the Z-axis in which the electrode 360, the electrode 380, and the piezoelectric material 370 are stacked.

Both the electrode 360 and the electrode 380 are electrically coupled to the wiring substrate 420. A signal supplied from the integrated circuit 421 mounted on the wiring substrate 420 is supplied to the electrode 360, and a signal at a reference potential propagating through the wiring substrate 420 is supplied to the electrode 380, and thereby, the signal supplied from the integrated circuit 421 and the signal at the reference potential are supplied to the piezoelectric material 370. Then, the piezoelectric material 370 is deformed by the potential difference generated between the electrode 360 and the electrode 380. The vibrating plate 350 is deformed or vibrated by the deformation of the piezoelectric material 370, and the volume of the pressure chamber 312 is changed by the deformation of the vibrating plate 350. A pressure change caused by the volume change of the pressure chamber 312 is applied to the ink contained in the pressure chamber 312, and thereby, the ink contained in the pressure chamber 312 is ejected from the nozzle 321 via the nozzle communication path 316. Here, the amount of the ink ejected from the nozzle 321 is the amount of the volume change of the pressure chamber 312.

In the following description, in the piezoelectric element 60, a portion in which piezoelectric strain occurs in the piezoelectric material 370 when a voltage is applied between the electrode 360 and the electrode 380 is referred to as an activated portion 410, and a portion in which piezoelectric strain does not occur in the piezoelectric material 370 is referred to as an inactivated portion 415. That is, in the piezoelectric element 60, the portion in which the piezoelectric material 370 is sandwiched between the electrode 360 and the electrode 380 corresponds to the activated portion 410, and the portion in which the piezoelectric material 370 is not sandwiched between the electrode 360 and the electrode 380 corresponds to the inactivated portion 415. When the piezoelectric element 60 is driven, a portion displaced in the direction along the Z-axis is referred to as a flexible portion, and a portion not displaced in the direction along the Z-axis is referred to as an inflexible portion. That is, a portion of the piezoelectric element 60 facing the pressure chamber 312 in the direction along the Z-axis corresponds to the flexible portion, and an outer portion of the pressure chamber 312 corresponds to the inflexible portion. The activated portion 410 may be referred to as an active portion, and the inactivated portion 415 may be referred to as an inactive portion.

In general, one of the electrodes of the activated portion 410 is formed as an independent individual electrode for each activated portion 410, and the other electrode is formed as a common electrode common to the plurality of activated portions 410. In the embodiment, the electrode 360 to which the signal output from the integrated circuit 421 is supplied is formed as the individual electrode, and the electrode 380 to which the signal of the reference potential propagating through the wiring substrate 420 is supplied is formed as the common electrode.

Specifically, the electrode 360 is provided at the +Z side with respect to the piezoelectric material 370 divisionally for each pressure chamber 312 to form the independent individual electrode for each activated portion 410. That is, the electrodes 360 are individually provided for the plurality of pressure chambers 312. The electrode 360 is formed with a width narrower than the width of the pressure chamber 312 in the direction along the Y-axis. That is, in the direction along the Y-axis, an end portion of the electrode 360 is located inside the region facing the pressure chamber 312.

Further, a +X-side end portion **360*a* and a −X-side end portion 360*b* of the electrode 360 are respectively disposed outside the pressure chamber 312. For example, in the first pressure chamber row, as shown in FIG. 5, the end portion 360*a* of the electrode 360 is disposed at the +X side of a +X-side end portion 312*a* of the pressure chamber 312. The end portion 360*b* of the electrode 360 is disposed at the −X side of a −X-side end portion 312*b* of the pressure chamber 312**.

The material of the electrode 360 is not particularly limited. For example, a conductive material including a metal such as platinum (Pt), iridium (Ir), gold (Au), or titanium (Ti) and a conductive metal oxide such as indium tin oxide abbreviated as ITO is used. Alternatively, the electrode may be formed by stacking a plurality of materials including platinum (Pt), iridium (Ir), gold (Au), and titanium (Ti). In the embodiment, platinum (Pt) is used as the electrode 360.

As shown in FIG. 3, the piezoelectric material 370 has a predetermined length in the direction along the X-axis, and is continuously provided in the direction along the Y-axis. That is, the piezoelectric material 370 is provided continuously along the arrangement direction of the pressure chambers 312 with a predetermined thickness. The thickness of the piezoelectric material 370 is not particularly limited, but the piezoelectric material is formed with a thickness of about 1,000 nanometers to 4,000 nanometers.

Further, as shown in FIG. 5, the length of the piezoelectric material 370 in the direction along the X-axis is longer than the length of the pressure chamber 312 in the direction along the X-axis as the longitudinal direction. Accordingly, on both sides of the pressure chamber 312 in the direction along the X-axis, the piezoelectric material 370 extends to the outside of the pressure chamber 312. Since the piezoelectric material 370 extends to the outside of the pressure chamber 312 in the direction along the X-axis, the strength of the vibrating plate 350 is increased. Therefore, when the piezoelectric element 60 is displaced by driving of the activated portion 410, the chance that cracks or the like are produced in the vibrating plate 350 and the piezoelectric element 60 may be reduced.

Further, for example, in the first pressure chamber row, as shown in FIG. 5, a +X side end portion **370*a* of the piezoelectric material 370 is located at the +X side at the outer side of the end portion 360*a* of the electrode 360. That is, the end portion 360*a* of the electrode 360 is covered by the piezoelectric material 370. On the other hand, a −X side end portion 370*b* of the piezoelectric material 370 is located at the +X side at the inner side of the end portion 360*b* of the electrode 360, and the end portion 360*b* of the electrode 360 is not covered by the piezoelectric material 370**.

In the piezoelectric material 370, as shown in FIGS. 3 and 6, a groove portion 371 as a portion thinner than the other regions is formed to correspond to each partition wall 311. The groove portion 371 of the embodiment is formed by complete removal of the piezoelectric material 370 in the direction along the Z-axis. That is, the piezoelectric material 370 having a portion thinner than the other regions includes a portion in which the piezoelectric material 370 is completely removed in the direction along the Z-axis. Obviously, the piezoelectric material 370 may be formed to be thinner than other portions on the bottom surface of the groove portion 371.

The length of the groove portion 371 in the direction along the Y-axis, that is, the width of the groove portion 371 is equal to or larger than the width of the partition wall 311. In the embodiment, the width of the groove portion 371 is wider than the width of the partition wall 311. The groove portion 371 is formed in a rectangular shape in the plan view from the −Z side. Obviously, the shape of the groove portion 371 in the plan view from the −Z side is not limited to the rectangular shape, but may be a polygonal shape having five or more sides, a circular shape, an elliptical shape, or the like.

The groove portion 371 is provided in the piezoelectric material 370, and thereby, the rigidity of the portion of the vibrating plate 350 facing the end portion of the pressure chamber 312 in the direction along the Y-axis, that is, the so-called arm portion of the vibrating plate 350 is suppressed and the piezoelectric element 60 can be displaced more favorably.

Examples of the piezoelectric material 370 include a crystal film having a perovskite structure, that is, a so-called perovskite crystal formed of a ferroelectric ceramic material exhibiting an electromechanical conversion effect formed on the electrode 360. As the material of the piezoelectric material 370, for example, a ferroelectric piezoelectric material such as lead zirconate titanate (PZT) or a material obtained by addition of a metal oxide such as niobium oxide, nickel oxide, or magnesium oxide to the ferroelectric piezoelectric material can be used. Specifically, lead titanate ($PbTiO_3$), lead zirconate titanate ($Pb(Zr,Ti)O_3$), lead zirconate titanate ($PbZrO_3$), lead lanthanum titanate ($Pb,La,TiO_3$), lead lanthanum zirconate titanate ($(Pb,La)(Zr,Ti)O_3$), lead magnesium niobate zirconium titanate ($Pb(Zr,Ti)(Mg,Nb)O_3$), or the like can be used. In the embodiment, lead zirconate titanate (PZT) is used as the piezoelectric material 370.

The material of the piezoelectric material 370 is not limited to a lead-based piezoelectric material containing lead, but a lead-free piezoelectric material containing no lead can be used. Examples of the lead-free piezoelectric material include bismuth ferrate (($BiFeO_3$), abbreviated as "BFO"), barium titanate (($BaTiO_3$), abbreviated as "BT"), potassium sodium niobate ($(K,Na)(NbO_3)$, abbreviated as "KNN"), lithium potassium sodium niobate ($(K,Na,Li)(NbO_3)$), lithium potassium tantalate niobate ($(K,Na,Li)(Nb,Ta)O_3$)), bismuth potassium titanate ($(Bi1/2K1/2)TiO_3$, abbreviated as "BKT"), bismuth sodium titanate ($(Bi1/2Na1/2)TiO_3$, abbreviated as "BNT"), bismuth manganate ($BiMnO_3$, abbreviated as "BM"), a composite oxide having a perovskite structure containing bismuth, potassium, titanium, and iron ($x[(BixK1\text{-}x)TiO_3]\text{-}(1\text{-}x)([BiFeO_3]$), abbreviated as "BKT-BF"), a composite oxide having a perovskite structure containing bismuth, iron, barium, and titanium ($(1\text{-}x)[BiFeO_3]\text{-}x[BaTiO_3]$, abbreviated as "BFO-BT"), and a material obtained by addition of a metal such as manganese, cobalt, and chromium thereto ($(1\text{-}x)[Bi(Fe1\text{-}yMy)O_3]\text{-}x[BaTiO_3]$) (M is Mn, Co, or Cr).

As shown in FIGS. 3, 5, and 6, the electrode 380 is provided at the −Z side opposite to the electrode 360 with respect to the piezoelectric material 370, and forms a common electrode common to the plurality of activated portions 410. That is, the electrode 380 is provided in common to the plurality of pressure chambers 312. The electrode 380 has a predetermined length in the direction along the X-axis, and is continuously provided in the direction along the Y-axis. The electrode 380 is also provided on the inner surface of the groove portion 371, that is, on the side surface of the groove portion 371 of the piezoelectric material 370 and on the insulating film 352 as the bottom surface of the groove portion 371. Inside of the groove portion 371, the electrode 380 may be provided only on a part of the inner surface of the groove portion 371, or may not necessarily be provided over the entire inner surface of the groove portion 371.

Further, for example, in the first pressure chamber row, as shown in FIG. 5, a +X-side end portion 380*a* of the electrode 380 is disposed at the +X side at the outer side of the end portion 360*a* of the electrode 360 covered by the piezoelectric material 370. That is, the end portion 380*a* of the electrode 380 is located at the +X side at the outer side of the end portion 312*a* of the pressure chamber 312 and at the +X side at the outer side of the end portion 360*a* of the electrode 360. In the embodiment, the end portion 380*a* of the electrode 380 substantially coincides with the end portion 370*a* of the piezoelectric material 370 in the direction along the X axis. Accordingly, a +X-side end portion of the activated portion 410, that is, a boundary between the activated portion 410 and the inactivated portion 415 is defined by the end portion 360*a* of the electrode 360.

On the other hand, a −X-side end portion 380*b* of the electrode 380 is disposed at the −x side at the outer side of the −X-side end portion 312*b* of the pressure chamber 312 and at the +X side at the inner side of the end portion 370*b* of the piezoelectric material 370. As described above, the end portion 370*b* of the piezoelectric material 370 is located at the inner side at the +X side of the end portion 360*b* of the electrode 360. Accordingly, the end portion 380*b* of the electrode 380 is located on the piezoelectric material 370 at the +X side of the end portion 360*b* of the electrode 360. Therefore, there is a portion in which the surface of the piezoelectric material 370 is exposed at the −X side of the end portion 380*b* of the electrode 380.

As described above, the end portion 380*b* of the electrode 380 is disposed at the +X side of the end portion 370*b* of the piezoelectric material 370 and the end portion 360*b* of the electrode 360. Therefore, a −X-side end portion of the activated portion 410, that is, a boundary between the activated portion 410 and the inactivated portion 415 is defined by the end portion 380*b* of the electrode 380.

The material of the electrode 380 is not particularly limited. For example, as with the electrode 360, a conductive material including a metal such as platinum (Pt), iridium (Ir), gold (Au), or titanium (Ti), or a conductive metal oxide such as indium tin oxide abbreviated as ITO is used. Alternatively, the electrode may be formed by stacking a plurality of materials including platinum (Pt), iridium (Ir), gold (Au), and titanium (Ti). In the embodiment, iridium (Ir) is used as the electrode 380.

Further, a wiring portion 385 that is the same layer as the electrode 380 but is electrically discontinuous with the electrode 380 is provided outside the end portion 380*b* of the electrode 380, that is, at the −X side of the end portion 380*b* of the electrode 380. The wiring portion 385 is formed apart without contact with the end portion 380*b* of the electrode 380 over from the piezoelectric material 370 to the electrode 360, which is extended to the −X side of the piezoelectric material 370. The wiring portion 385 is provided independently for each activated portion 410. That is, the plurality of wiring portions 385 are arranged at predetermined intervals in the direction along the Y-axis. The wiring portion 385 may be formed in a layer different from the electrode 380, but is preferably formed in the same layer as the electrode 380. Accordingly, the manufacturing process of the wiring portion 385 may be simplified and the cost may be reduced.

Regarding the electrode 360 and the electrode 380 forming the piezoelectric element 60, the individual lead electrode 391 is coupled to the electrode 360 and the common lead electrode 392 as a common electrode for driving is electrically coupled to the electrode 380. The flexible wiring substrate 420 is electrically coupled to the individual lead electrode 391 and an end portion of the common lead electrode 392 at the opposite side to an end portion coupled to the piezoelectric element 60. A plurality of wires for coupling the control unit 10, the temperature information output circuit 26, and a plurality of circuits (not shown) are formed on the wiring substrate 420. In the embodiment, the wiring substrate 420 includes, for example, an FPC (flexible printed circuit). Instead of the FPC, any flexible substrate such as an FFC (flexible flat cable) may be used.

In the embodiment, the individual lead electrode 391 and the common lead electrodes 392 are extended to be exposed within the through hole 332 formed in the protective substrate 330, and electrically coupled to the wiring substrate 420 in the through hole 332. The integrated circuit 421 that outputs the signal for driving the piezoelectric elements 60 is mounted on the wiring substrate 420.

In the embodiment, the individual lead electrode 391 and the common lead electrode 392 are formed in the same layer to be electrically discontinuous. Accordingly, the manufacturing process can be simplified and the cost can be reduced as compared with a case where the individual lead electrode 391 and the common lead electrode 392 are separately formed. Obviously, the individual lead electrodes 391 and the common lead electrodes 392 may be formed in different layers.

The material of the individual lead electrode 391 and the common lead electrode 392 is not particularly limited as long as the material has conductivity. For example, gold (Au), copper (Cu), titanium (Ti), tungsten (W), nickel (Ni), chromium (Cr), platinum (Pt), aluminum (Al), or the like can be used. In the embodiment, gold (Au) is used for the individual lead electrode 391 and the common lead electrode 392. Further, the individual lead electrode 391 and the common lead electrode 392 may have adhesion layers for increasing adhesion to the electrode 360, the electrode 380, and the vibrating plate 350.

The individual lead electrode 391 is provided for each activated portion 410, that is, for each electrode 360. As shown in FIG. 5, for example, in the first pressure chamber row, the individual lead electrode 391 is coupled via the wiring portion 385 to a part in the vicinity of the end portion 360*b* of the electrode 360 that is provided outside of the piezoelectric material 370, and is led out to the −X side onto the pressure chamber substrate 310, actually, onto the vibrating plate 350.

On the other hand, as shown in FIG. 3, for example, in the first pressure chamber row, the common lead electrodes 392 is led out to the −X side over from the electrode 380, which forms the common electrode on the piezoelectric material 370, to the vibrating plate 350 at both end portions in the direction along the Y-axis. The common lead electrode 392 includes an extended portion 392*a* and an extended portion 392*b*. As shown in FIGS. 3 and 5, for example, in the first pressure chamber row, the extended portion 392*a* is extended in the direction along the Y axis in a region corresponding to the end portions 312*a* of the pressure chambers 312, and the extended portion 392*b* is extended in the direction along the Y axis in a region corresponding to the end portions 312*b* of the pressure chambers 312. These extended portion 392*a* and extended portion 392*b* are provided continuously over the plurality of active portions 410 in the direction along the Y-axis.

The extended portion 392*a* and the extended portion 392*b* are extended from inside of the pressure chambers 312 to outside of the pressure chambers 312 in the direction along the X-axis. In the embodiment, the activated portions 410 of the piezoelectric elements 60 are extended to outside of the pressure chambers 312 in both end portions of the pressure chambers 312 in the direction along the X-axis, and the extended portion 392*a* and the extended portion 392*b* are extended to outside of the pressure chambers 312 on the activated portions 410.

As shown in FIG. 5, the resistance wire 401 is provided on the −Z-side surface of the vibrating plate 350. The resistance wire 401 detects the temperatures of the pressure chambers 312 using the characteristic that the electrical resistance value changes with the temperature. As the material of the resistance wire 401, a material having a temperature-dependent electrical resistance value including, for example, gold (Au), platinum (Pt), iridium (Ir), aluminum (Al), copper (Cu), titanium (Ti), tungsten (W), nickel (Ni), and chromium (Cr) can be used. Of the materials, platinum (Pt) has a resistance value that largely changes depending on the temperature, and has higher stability and accuracy. Further, platinum (Pt) has a resistance value that changes linearly with respect to a temperature change. From this viewpoint, platinum (Pt) is preferably used as the material of the resistance wire 401. That is, the resistance wire 401 preferably contains platinum (Pt). In the embodiment, the resistance wire 401 is stacked on the −Z-side surface of the vibrating plate 350 in the same layer as the electrodes 360 to be electrically discontinuous with the electrodes 360. That is, the resistance wire 401 includes a wiring pattern stacked on the −Z-side surface of the vibrating plate 350 in the direction along the Z-axis, and the wiring pattern contains platinum (Pt).

As shown in FIG. 3, one end of the resistance wire 401 is coupled to a measurement lead electrode 393*a*, and the other end of the resistance wire 401 is coupled to the measurement lead electrode 393*b*. The measurement lead electrodes 393*a* and 393*b* are electrically coupled to the wiring substrate 420. Accordingly, signals of voltage values corresponding to the electrical resistance values that change depending on the temperatures of the pressure chambers 312 as the temperatures of the pressure chambers 312 detected by the resistance wire 401 are output from the print head 22. In the embodiment, the resistance wire 401 is covered by the piezoelectric materials 370, and is located between the vibrating plate 350 and the piezoelectric materials 370 in the direction along the Z-axis.

The resistance wire 401 includes a first pressure chamber row-side meandering pattern positioned at the +X side in the direction along the X-axis and a second pressure chamber row-side meandering pattern positioned at the −X side in the direction along the X-axis. As seen from the −Z side, the first pressure chamber row-side meandering pattern is positioned to overlap with the supply communication paths 319 communicating with the respective pressure chambers 312 forming the first pressure chamber row, and meanders in the directions along the Y-axis. As seen from the −Z side, the second pressure chamber row-side meandering pattern is positioned to overlap the supply communication paths 319 communicating with the respective pressure chambers 312 forming the second pressure chamber row, and meanders in the direction along the Y-axis. That is, the resistance wire 401 includes the first pressure chamber row-side meandering pattern corresponding to the first pressure chamber row formed by the plurality of pressure chambers 312, and the second pressure chamber row-side meandering pattern corresponding to the second pressure chamber row formed by the plurality of pressure chambers 312.

As shown in FIGS. 4 and 5, the distance between the −Z-side end portion of the pressure chamber 312 and the resistance wire 401 in the direction along the Z-axis is shorter than the dimension of the pressure chamber 312 in the direction along the Z-axis. Further, for example, in the first pressure chamber row, the longest distance between the +X-side end portion 312*a* of the pressure chamber 312 and the resistance wire 401 in the direction along the X-axis is shorter than the dimension of the pressure chamber 312 in the direction along the X-axis. Accordingly, the electrical resistance value of the resistance wire 401 readily changes in response to the temperature change of the pressure chamber 312.

In the embodiment, the measurement lead electrode 393 including the measurement lead electrode 393*a* and the measurement lead electrode 393*b* is formed in the same layer as the individual lead electrodes 391 and the common lead electrode 392 to be electrically discontinuous. Accordingly, the manufacturing process can be simplified and the cost can be reduced as compared with the case where the measurement lead electrode 393 is formed separately from the individual lead electrodes 391 and the common lead electrodes 392. Obviously, the measurement lead electrode 393 may be formed in a layer different from that of the individual lead electrodes 391 and the common lead electrodes 392.

The material of the measurement lead electrode 393 is not particularly limited as long as the material has conductivity. For example, gold (Au), copper (Cu), titanium (Ti), tungsten (W), nickel (Ni), chromium (Cr), platinum (Pt), aluminum (Al), or the like can be used. In the embodiment, gold (Au) is used as the measurement lead electrode 393. Therefore, the material of the measurement lead electrode 393 is the same as that of the individual lead electrodes 391 and the common lead electrode 392. Further, the measurement lead electrode 393 may have an adhesion layer for increasing adhesion to the resistance wire 401 and the vibrating plate 350.

As described above, in the embodiment, the measurement lead electrode 393 is extended to be exposed within the through hole 332 formed in the protective substrate 330, and electrically coupled to the wiring substrate 420 in the through hole 332. Accordingly, the electrical resistance value of the resistance wire 401 that changes depending on the temperature of the pressure chamber 312 is output from the print head 22 via the wiring substrate 420.

That is, the print head 22 of the head unit 20 of the embodiment includes the piezoelectric element 60 including the electrode 360, the electrode 380, and the piezoelectric material 370, the piezoelectric material 370 being positioned between the electrode 360 and the electrode 380 in the direction along the Z-axis in which the electrode 360, the electrode 380, and the piezoelectric material 370 are stacked, and receiving the drive signal COM and being driven, the vibrating plate 350 positioned at the +Z side as one side in the direction along the Z-axis with respect to the piezoelectric element 60 and deformed by the driving of the piezoelectric element 60, the pressure chamber substrate 310 positioned at the +Z side as one side in the direction along the Z-axis with respect to the vibrating plate 350 and provided with the pressure chamber 312 having the volume that changes by the deformation of the vibrating plate 350, the nozzle 321 ejecting the ink in response to the change of the volume of the pressure chamber 312, and the resistance wire 401 positioned at the −Z side as the other side in the direction along the Z-axis with respect to the vibrating plate 350 and acquiring the temperature corresponding to the temperature of the pressure chamber 312.

Figure 7:
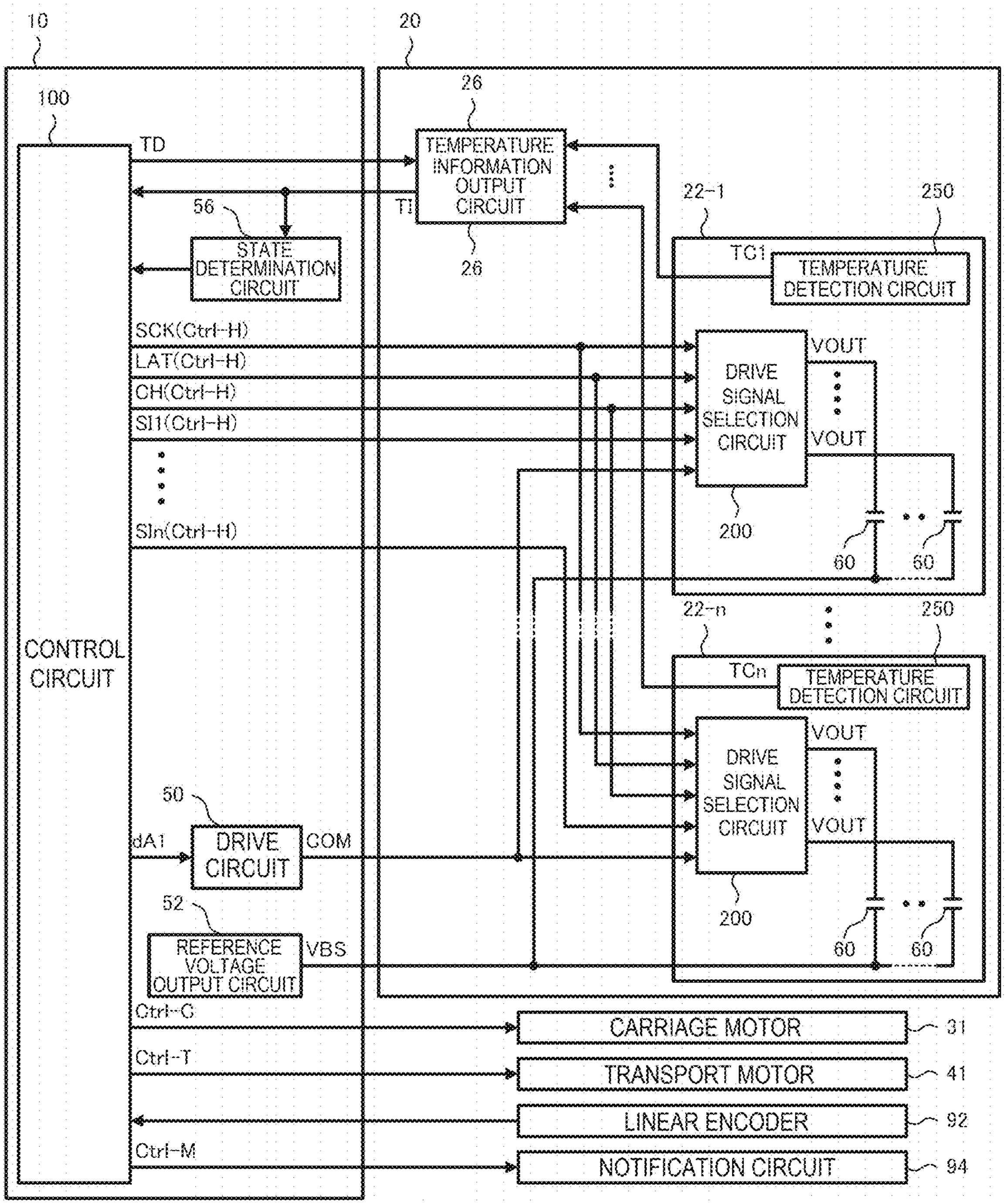
FIG. 7 shows a functional configuration of the liquid ejection apparatus.

2. Functional Configuration of Liquid Ejection Apparatus
Functional Configuration of Liquid Ejection Apparatus Next, a functional configuration of the liquid ejection apparatus 1 will be described. FIG. 7 shows the functional configuration of the liquid ejection apparatus 1. As shown in FIG. 7, the liquid ejection apparatus 1 includes the control unit 10, the head unit 20, the carriage motor 31, the transport motor 41, an encoder sensor 92, and a notification circuit 94.

The control unit 10 includes a drive circuit 50, a reference voltage output circuit 52, a state determination circuit 56, and a control circuit 100. The control circuit 100 includes, for example, a processing circuit such as a CPU or an FPGA and a memory circuit such as a semiconductor memory. An image information signal containing image data and the like is input to the control circuit 100 from an external apparatus such as a host computer communicably connected to the outside of the liquid ejection apparatus 1. The control circuit 100 generates various signals for controlling the liquid ejection apparatus 1 based on the input image information signal, and outputs the signals to corresponding components.

In a specific example, in addition to the above described image information signal, a detection signal based on the scanning position of the above described carriage 21 in the head unit 20 is input from the encoder sensor 92 to the control circuit 100. Accordingly, the control circuit 100 grasps the scanning position of the carriage 21 as the scanning position of the head unit 20 including the print head 22. The control circuit 100 generates various signals according to the input image information signal and the grasped scanning position of the head unit 20, and outputs the signals to corresponding components.

Specifically, the control circuit 100 generates the control signal Ctrl-C for controlling the movement of the head unit 20 along the scanning axis of the head unit 20 according to the scanning position thereof, and outputs the control signal to the carriage motor 31. Accordingly, the carriage motor 31 operates to control the movement of the head unit 20 mounted at the carriage 21 along the scanning axis and the scanning position. Further, the control circuit 100 generates the control signal Ctrl-T for controlling the transport of the medium P, and outputs the control signal to the transport motor 41. Accordingly, the transport motor 41 operates to control the movement of the medium P along the transport direction. Note that the control signal Ctrl-C may be converted through a driver circuit (not shown) and then input to the carriage motor 31, and the control signal Ctrl-T may be converted through a driver circuit (not shown) and then input to the transport motor 41.

The control circuit 100 generates print data signals SI1 to SIn, a change signal CH, a latch signal LAT, and a clock signal SCK as the control signal Ctrl-H for controlling the head unit 20 based on the image information signal input from the external apparatus and the scanning position of the head unit 20, and outputs the signals to the head unit 20.

Further, the control circuit 100 generates a temperature acquisition request signal TD for acquiring the temperature of the head unit 20 at a predetermined timing, and outputs the signal to the head unit 20. Accordingly, a temperature information signal TI containing the temperature of the head unit 20 according to the temperature acquisition request signal TD is input to the control circuit 100. The control circuit 100 grasps the state of the head unit 20 based on the input temperature information signal TI, corrects the control signals Ctrl-H, Ctrl-C, and Ctrl-T, and outputs the corrected signals to the corresponding components. Accordingly, the operations of the liquid dispensing apparatus 1 and the head unit 20 are controlled according to the temperature information signal TI as the temperature of the print head 22. As a result, the ejection accuracy of the inks ejected from the liquid ejection apparatus 1 and the head unit 20 is increased.

The temperature information signal TI input from the head unit 20 is also input to the state determination circuit 56. The state determination circuit 56 determines the state of the head unit 20 as the states of the print heads 22-1 to **22-*n*, which will be described below, of the head unit 20 based on the input temperature information signals TI. Then, the state determination circuit 56 generates a state signal SS according to the determination result and outputs the signal to the control circuit 100. Details of a method of determining the states of the print heads 22-1 to 22-*n* in the state determination circuit 56** will be described later.

The control circuit 100 generates a digital base drive signal dA1 as the control signal Ctrl-H, and outputs the signal to the drive circuit 50. The drive circuit 50 generates a drive signal COM having a signal waveform defined by the base drive signal dA1 as the drive signal COM, and outputs the signal to the head unit 20.

Specifically, the base drive signal dA1 output by the control circuit 100 is input to the drive circuit 50. The drive circuit 50 performs digital/analog signal conversion on the input base drive signal dA1, and then performs class D amplification on the converted analog signal to generate the drive signal COM, and outputs the signal to the head unit 20. That is, the control circuit 100 outputs the base drive signal dA1 as the control signal Ctrl-H corrected based on the temperature information signal TI, and the drive circuit 50 outputs the corrected drive signal COM according to the base drive signal dA1 corrected based on the temperature information signal TI. Here, the base drive signal dA1 output by the control circuit 100 is a digital signal that defines the signal waveform of the drive signal COM, but the base drive signal dA1 may be an analog signal as long as the signal can define the signal waveform of the drive signal COM. The drive circuit 50 may generate the drive signal COM by performing class A amplification, class B amplification, and class AB amplification on the signal waveform defined by the base drive signal dA1.

The reference voltage output circuit 52 generates a reference voltage signal VBS and outputs the signal to the head unit 20. The reference voltage signal VBS is a signal having a constant voltage value as a reference for driving the piezoelectric element 60, and is supplied to the electrode 380 as the common electrode. The voltage value of the reference voltage signal VBS may be, for example, a constant signal at the ground potential, or may be constant at a potential of 5.5 V, 6 V, or the like.

The control circuit 100 generates the control signal Ctrl-M for notifying a user of operation statuses of the drive circuit 50, the reference voltage output circuit 52, and the head unit 20, and outputs the signal to the notification circuit 94. Accordingly, the operation status of the liquid ejection apparatus 1 is notified to the user. Here, the notification circuit 94 may be configured to notify the user of the operation status of the liquid ejection apparatus 1. Therefore, the notification circuit 94 may include a liquid crystal display or a light emitting device for visual notification of the operation status, or may include a speaker or a buzzer for audible notification of the operation status.

The head unit 20 includes the print heads 22-1 to 22-*n* as the plurality of print heads 22 and the temperature information output circuit 26. Each of the print heads 22-1 to 22-*n* includes a drive signal selection circuit 200, a temperature detection circuit 250, and a plurality of the piezoelectric elements 60.

The print data signal SI1, the change signal CH, the latch signal LAT, the clock signal SCK, the drive signal COM, and the reference voltage signal VBS output by the control circuit 100 are input to the print head 22-1. The clock signal SCK, the latch signal LAT, the change signal CH, the print data signal SI1, and the drive signal COM input to the print head 22-1 are input to the drive signal selection circuit 200.

The drive signal selection circuit 200 selects or deselects the signal waveform contained in the drive signal COM based on the input clock signal SCK, latch signal LAT, change signal CH, and print data signal SI1, and thereby, generates a drive signal VOUT corresponding to each of the plurality of piezoelectric elements 60. Specifically, the drive signal selection circuit 200 controls selection or deselection of the signal waveform contained in the drive signal COM according to the print data signal SI input in synchronization with the clock signal SCK at a timing defined by the latch signal LAT and the change signal CH. Thereby, the drive signal selection circuit 200 generates the drive signal VOUT corresponding to each of the plurality of ejection portions 600 and outputs the drive signal to the corresponding ejection portion 600.

The drive signal VOUT output by the drive signal selection circuit 200 is supplied to each of the electrodes 360 as the individual electrodes at one end of the corresponding piezoelectric element 60. Here, the reference voltage signal VBS is commonly input to the electrode 380 as the common electrode at the other ends of the plurality of piezoelectric elements 60. Accordingly, each of the plurality of piezoelectric elements 60 is displaced by the potential difference between the drive signal VOUT input to the electrode 360 and the reference voltage signal VBS input to the electrode 380, and the amount of ink according to the displacement of the piezoelectric element 60 is ejected from the corresponding nozzle 321 of the print head 22-1. Here, as the above described integrated circuit 421, at least a part of the drive signal selection circuit 200 may be mounted on the wiring substrate 420 of the print head 22-1.

The temperature detection circuit 250 of the print head 22-1 detects the temperature of the print head 22-1. Then, the temperature detection circuit 250 acquires head temperature information tc1 of a voltage value corresponding to the detected temperature of the print head 22-1, and outputs a head temperature signal TC1 containing the acquired head temperature information tc1 to the temperature information output circuit 26. Here, at least a part of the temperature detection circuit 250 of the print head 22-1 is provided as the above described resistance wire 401 in the print head 22-1. That is, the head temperature information tc1 of the voltage value corresponding to the temperature of the print head 22-1 output by the temperature detection circuit 250 contains information of the voltage value that changes according to the resistance value of the resistance wire 401 that changes depending on the temperature.

In addition, the print heads 22-2 to 22-*n* have the same configuration as the print head 22-1 except that the input signals and the output signals are different, and perform the same operation. Specifically, the clock signal SCK, the latch signal LAT, the change signal CH, the print data signal SIi, the drive signal COM, and the reference voltage signal VBS are input to the print head 22-*i* (i is one of 2 to n). The drive signal selection circuit 200 of the print head 22-*i* selects or deselects the signal waveform of the drive signal COM based on the input clock signal SCK, latch signal LAT, change signal CH, and print data signal SIi, and thereby, generates the drive signal VOUT corresponding to each of the plurality of piezoelectric elements 60 and outputs the drive signal VOUT to the electrode 360 of the corresponding piezoelectric element 60. The reference voltage signal VBS is commonly input to the electrodes 380 of the plurality of piezoelectric elements 60 of the print head 22-*i*. Accordingly, the plurality of piezoelectric elements 60 of the print head 22-*i* are driven, and amounts of inks according to the driving of the piezoelectric elements 60 are ejected from the nozzle 321 of the print head 22-*i*.

The temperature detection circuit 250 of the print head 22-*i* acquires head temperature information tci of a voltage value corresponding to the temperature of the print head 22-*i*, and outputs a head temperature signal TCi containing the acquired head temperature information tci to the temperature information output circuit 26. Here, at least a part of the drive signal selection circuit 200 of the print head 22-*i* is mounted on the wiring substrate 420 of the print head 22-*i* as the above described integrated circuit 421, and at least a part of the temperature detection circuit 250 of the print head 22-*i* is provided in the print head 22-*i* as the above described resistance wire 401.

In the following description, the clock signal SCK, the latch signal LAT, and the change signal CH, the print data signal SI as the print data signals SI1 to SIn, the drive signal COM, and the reference voltage signal VBS are input to the print head 22 when it is not necessary to distinguish the print heads 22-1 to 22-*n*. The temperature detection circuits 250 of the print head 22 acquires the head temperature information tc as the head temperature information tc1 to tcn of the voltage values according to the temperature of the print head 22, and the print heads 22 outputs the head temperature signal TC as the head temperature signals TC1 to TCn containing the acquired head temperature information tc.

The temperature information output circuit 26 generates the temperature information signals TI according to the head temperature signals TC1 to TCn output by the respective print heads 22-1 to 22-*n* and the temperature acquisition request signal TD output by the control circuit 100, and outputs the temperature information signal TI to the control circuit 100.

Specifically, the temperature information output circuit 26 amplifies the head temperature signals TC1 to TCn and selects the amplified head temperature signals TC1 to TCn according to the temperature acquisition request signal TD input from the control circuit 100. Then, the temperature information output circuit 26 converts the selected and amplified head temperature signals TC1 to TCn into the temperature information signals TI corresponding to the temperatures of the corresponding print heads 22, and outputs the temperature information signals TI to the control circuit 100.

As described above, the liquid ejection apparatus 1 of the embodiment includes the drive circuit 50 outputting the drive signal COM corrected based on the temperature information signal TI, the print heads 22-1 to 22-*n* receiving the drive signals VOUT corresponding to the drive signal COM and ejecting the liquid, the temperature information output circuit 26 acquiring the head temperature signals TC1 to TCn indicating the temperatures of the print heads 22-1 to 22-*n* and outputting the temperature information signal TI based on at least one of the head temperature signals TC1 to TCn, the state determination circuit 56 determining the states of the corresponding print heads 22-1 to 22-*n* based on the temperature information signal TI, and the notification circuit 94 notifying the user of the information.

Configuration of Temperature Information Output Circuit

Figure 8:
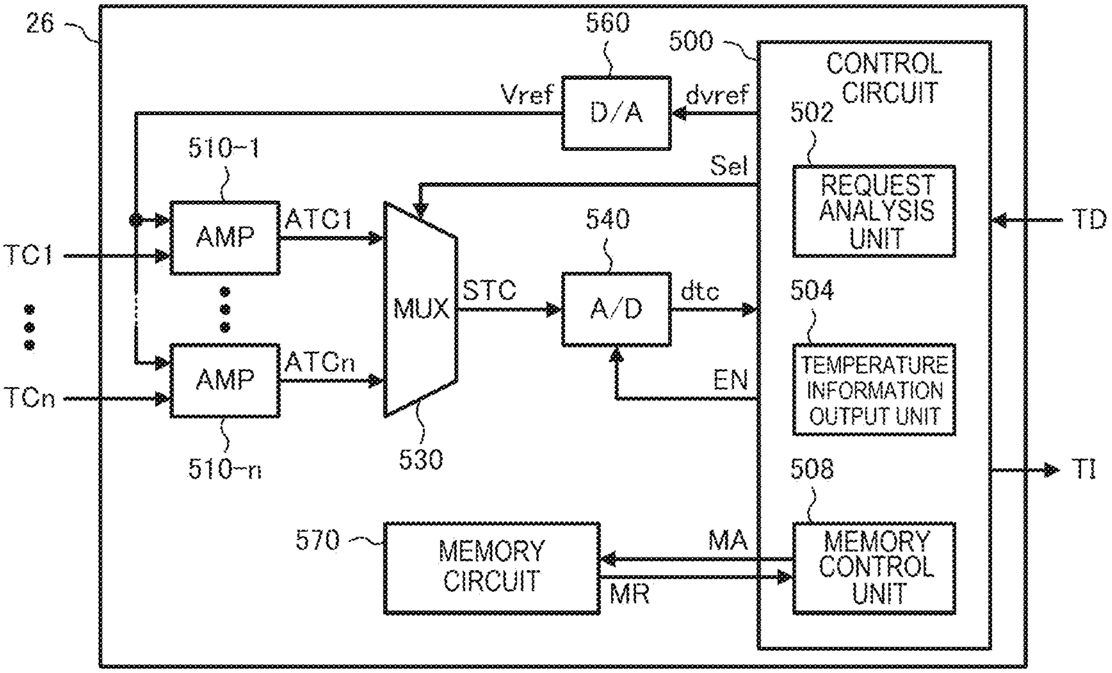
FIG. 8 shows an example of a configuration of a temperature information output circuit.

Next, a configuration and an operation of the temperature information output circuit 26 will be described. FIG. 8 shows an example of the configuration of the temperature information output circuit 26. The temperature information output circuit 26 acquires the head temperature signals TC1 to TCn containing the head temperature information tc1 to tcn input from the print heads 22-1 to 22-*n*, respectively, and generates the temperature information signal TI indicating the temperature of the print heads 22 corresponding to the temperature acquisition request signal TD input from the control circuit 100. Then, the temperature information output circuit 26 outputs the generated temperature information signal TI to the control circuit 100 and the state determination circuit 56.

As shown in FIG. 8, the temperature information output circuit 26 includes a control circuit 500, amplifier circuits 510-1 to 510-*n*, a multiplexer 530, an AD conversion circuit 540, a DA conversion circuit 560, and a memory circuit 570.

The amplifier circuits 510-1 to 510-*n* are provided to correspond to the print heads 22-1 to 22-*n*. Each of the head temperature signals TC1 to TCn output from the corresponding print heads 22-1 to 22-*n* and a reference potential signal Vref are input to each of the amplifier circuits 510-1 to 510-*n*. The respective amplifier circuits 510-1 to 510-*n* amplify differences between the voltage value of the reference potential signal Vref and the voltage values of the head temperature signals TC1 to TCn as the voltage values of the head temperature information tc, and thereby, generate and output the head temperature amplified signals ATC1 to ATCn. That is, each of the amplifier circuits 510-1 to 510-*n* includes a differential amplifier circuit.

Specifically, the head temperature signal TC1 output by the print head 22-1 and the reference potential signal Vref are input to the amplifier circuit 510-1. The amplifier circuit 510-1 outputs a head temperature amplified signal ATC1 obtained by amplifying the difference between the voltage value of the input head temperature signal TC1 and the voltage value of the reference potential signal Vref. The head temperature signal TCj (j is one of 1 to n) output by the print head 22-*j* and the reference potential signal Vref are input to the amplifier circuit 510-*j*. The amplifier circuit 510-*j* outputs a head temperature amplified signal ATCj obtained by amplifying a difference between the voltage value of the input head temperature signal TCj and the voltage value of the input reference potential signal Vref. Here, all of the amplifier circuits 510-1 to 510-*n* have the same configuration, and may be referred to as an amplifier circuit 510 when it is not necessary to distinguish the circuits in the following description. In this case, the head temperature signals TC as the head temperature signals TC1 to TCn and the reference potential signal Vref are input to the amplifier circuit 510, and the circuit outputs the head temperature amplified signals ATC as the head temperature amplified signals ATC1 to ATCn.

The head temperature amplified signals ATC1 to ATCn output by the respective amplifier circuits 510-1 to 510-*n* are input to the multiplexer 530. A select signal Sel output by the control circuit 500 is input to the multiplexer 530. The multiplexer 530 selects one of the head temperature amplification signals ATC1 to ATCn input from the respective amplifier circuits 510-1 to 510-*n* according to the input selection signal Sel, and outputs the selected signal as a selected temperature signal STC.

The selected temperature signal STC output by the multiplexer 530 and an enable signal EN1 output by the control circuit 500 are input to the AD conversion circuit 540. The AD conversion circuit 540 converts the selected temperature signal STC input during a period in which the input enable signal EN1 is enabled into a digital signal and outputs the digital signal to the control circuit 500. That is, the AD conversion circuit 540 generates a digital signal according to a voltage value obtained by amplification of the voltage value of the head temperature information tc contained in the head temperature signal TC selected by the multiplexer 530 during the period in which the enable signal EN1 is enabled by the amplifier circuit 510 as a digital signal of the voltage value according to the temperature of the print head 22 corresponding to the head temperature signal TC selected by the multiplexer 530 during the period in which the enable signal EN1 is enabled, and outputs the generated digital signal to the control circuit 500. In the following description, the digital signal output by the AD conversion circuit 540 is referred to as digital temperature information dtc.

The control circuit 500 includes a request analysis unit 502, a temperature information output unit 504, and a memory control unit 508. The temperature acquisition request signal TD is input to the control circuit 500. The control circuit 500 outputs the select signal Sel according to the input temperature acquisition request signal TD, the enable signal EN1, and a digital reference potential signal dvref. Thereby, the control circuit 500 controls various components in the temperature information output circuit 26. The digital temperature information dtc is input to the control circuit 500. The control circuit 500 generates the temperature information signals TI based on the input digital temperature information dtc, and outputs the signals from the temperature information output circuit 26.

Specifically, the request analysis unit 502 acquires the temperature acquisition request signal TD input to the control circuit 500. The request analysis unit 502 analyzes the acquired temperature acquisition request signal TD and generates the digital reference potential signal dvref, the select signal Sel, and the enable signal EN1 according to the analysis result. The control circuit 500 outputs the digital reference potential signal dvref, the select signal Sel, and the enable signal EN1 generated by the request analysis unit 502 to the corresponding components of the temperature information output circuit 26.

The temperature information output unit 504 acquires the digital temperature information dtc input to the control circuit 500. The temperature information output unit 504 converts the acquired digital temperature information dtc into the temperature information signal TI corresponding to the temperature of the print heads 22-1 to 22-*n* using a predetermined conversion function. The control circuit 500 outputs the temperature information signal TI corresponding to the digital temperature information dtc converted by the temperature information output unit 504 to the control circuit 100. Here, as the predetermined conversion function for converting the acquired digital temperature information dtc into the temperature information signals TI according to the temperature of the print heads 22-1 to 22-*n* by the temperature information output unit 504, a function according to the temperature characteristic of the resistance value of the resistance wire 401 can be used. That is, in the liquid ejection apparatus 1 of the embodiment using platinum (Pt) having the resistance value that changes highly linearly depending on the temperature change as the resistance wire 401, a linear function can be used as the conversion function.

The memory control unit 508 generates a memory control signal MA for accessing the memory circuit 570, outputs the signal to the memory circuit 570, and acquires a memory read signal MR output by the memory circuit 570 according to the memory control signal MA.

Specifically, the memory circuit 570 stores information on the voltage value of the above described reference potential signal Vref and information on the predetermined conversion function used for converting the digital temperature information dtc into the temperature information signal TI. Further, the memory circuit 570 may store correction values for correcting variations in various components including the resistance wire 401.

The memory control unit 508 generates the memory control signal MA for reading the information on the voltage value of the reference potential signal Vref and the information on the predetermined conversion function used for converting the digital temperature information dtc into the temperature information signal TI stored in the memory circuit 570, and outputs the memory control signal MA to the memory circuit 570. The memory circuit 570 reads the information on the voltage value of the reference potential signal Vref and the information on the predetermined conversion function used for converting the digital temperature information dtc into the temperature information signal TI according to the input memory control signal MA, and outputs the memory read signal MR containing the read information. Thereby, the information stored in the memory circuit 570 is read by the control circuit 500.

The temperature information output circuit 26 having the above described configuration is preferably configured as an integrated circuit, for example. Thereby, the mounting area of the temperature information output circuit 26 in the head unit 20 can be reduced, and as a result, the head unit 20 can be downsized. In this case, the temperature information output circuit 26 may include one or more integrated circuits.

Operation of Temperature Information Output Circuit

Next, an operation of the state determination circuit 56 to which the temperature information signals TI output by the temperature information output circuit 26 are input, determining the state of the head unit 20, that is, the states of the print heads 22-1 to **22-*n*, which is described below, of the head unit 20** will be described.

Figure 9:
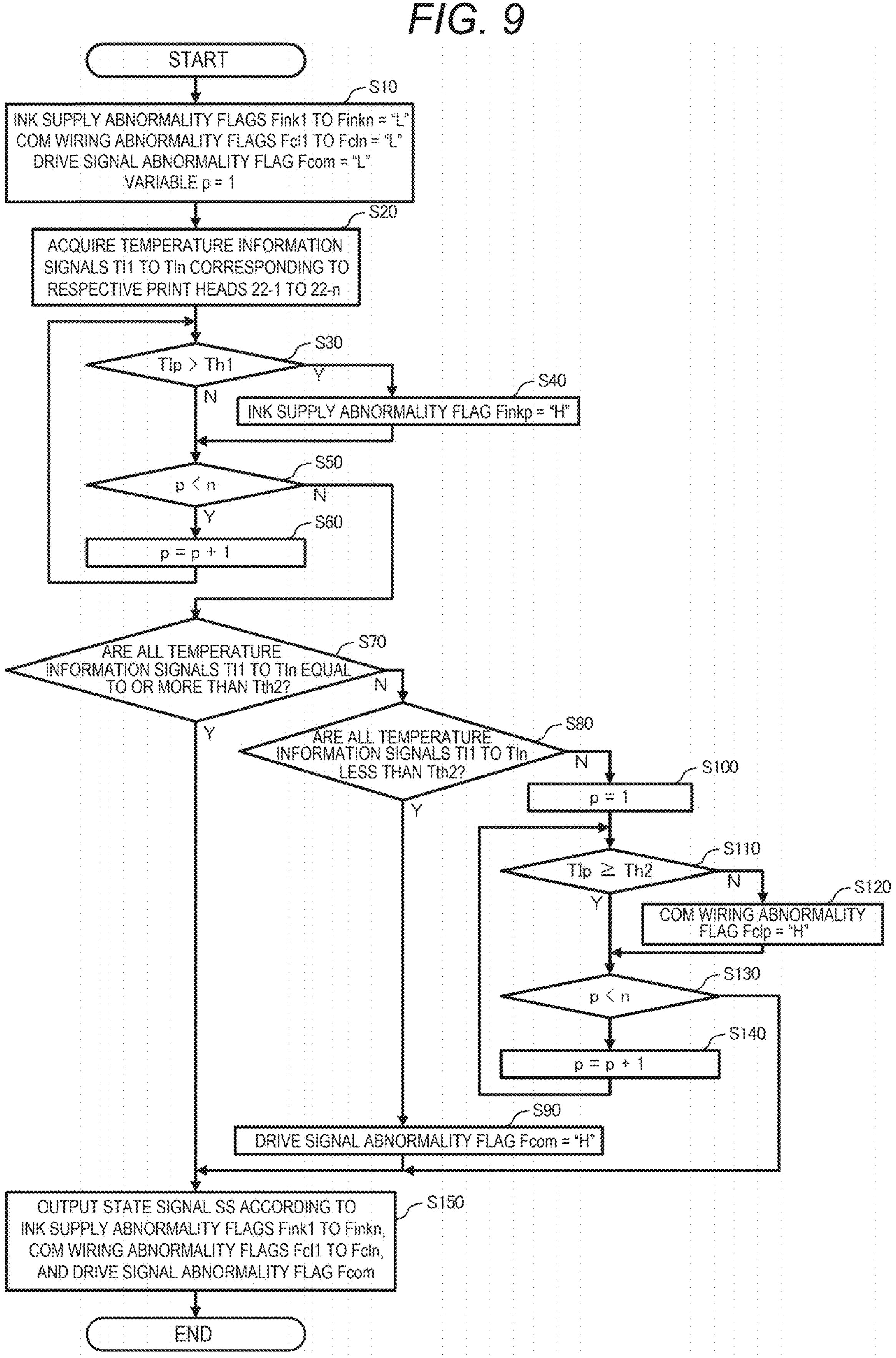
FIG. 9 is a diagram for explanation of an operation of a state determination circuit.

FIG. 9 is a diagram for explanation of the operation of the state determination circuit 56. The state determination circuit 56 executes a predetermined initialization process when the operation starts. Specifically, the state determination circuit 56 initializes logic levels of ink supply abnormality flags Fink1 to Finkn, logic levels of COM wiring abnormality flags Fcl1 to Fcln, and a logic level of a drive signal abnormality flag Fcom to L-levels, and initializes a variable p to "1" (step S10).

Here, the ink supply abnormality flags Fink1 to Finkn are ones of the flags indicating the states of the print heads 22-1 to **22-*n* and indicate whether the inks are normally supplied to the respective print heads 22-1 to 22-*n*. Specifically, the ink supply abnormality flag Fink1 is the flag indicating whether the ink is normally supplied to the print head 22-1 and the ink supply abnormality flag Finki is the flag indicating whether the ink is normally supplied to the print head 22-*i*. In the following description, the logic levels of the ink supply abnormality flags Fink1 to Finkn when the inks are normally supplied to the respective print heads 22-1 to 22-*n* are the L-levels, and the logic levels of the ink supply abnormality flags Fink1 to Finkn when the inks are not normally supplied to the respective print heads 22-1 to 22-*n*** are H-levels.

Further, the COM wiring abnormality flags Fcl1 to Fcln are ones of the flags indicating the states of the print heads 22-1 to **22-*n* and indicate whether propagation paths through which the drive signals COM supplied to the respective print heads 22-1 to 22-*n* propagate are normal. Specifically, the COM wiring abnormality flag Fcl1 is the flag indicating whether the propagation path through which the drive signal COM supplied to the print head 22-1 propagates is normal, and the COM wiring abnormality flag Fcli is the flag indicating whether the propagation path through which the drive signal COM supplied to the print head 22-*i* propagates is normal. In the following description, the logic levels of the COM wiring abnormality flags Fcl1 to Fcln when the propagation paths through which the drive signals COM supplied to the respective print heads 22-1 to 22-*n* propagate are normal are the L-levels, and the logic levels of the COM wiring abnormality flags Fcl1 to Fcln when the propagation paths through which the drive signals COM supplied to the respective print heads 22-1 to 22-*n*** propagate are not normal are H-levels.

The drive signal abnormality flag Fcom is one of the flags indicating the states of the print heads 22-1 to **22-*n* and indicates whether the drive signal COM commonly supplied to the print heads 22-1 to 22-*n* is normal. Specifically, the drive signal abnormality flag Fcom is the flag indicating whether the drive circuit 50 normally outputs the drive signal COM commonly supplied to the print heads 22-1 to 22-*n*. In the following description, the logic level of the drive signal abnormality flag Fcom when the drive circuit 50 normally outputs the drive signal COM commonly supplied to the print heads 22-1 to 22-*n* is the L-level, and the logic level of the drive signal abnormality flag Fcom when the drive circuit 50 does not normally output the drive signal COM commonly supplied to the print heads 22-1 to 22-*n*** is the H-level.

After the initialization process ends, the state determination circuit 56 acquires the temperature information signal TI corresponding to each temperature of the print heads 22-1 to **22-*n* acquired by the temperature information output circuit 26 based on the temperature acquisition request signal TD. In the following description, among the temperature information signals TI output by the temperature information output circuit 26, the temperature information signal TI corresponding to the temperature of the print head 22-1 is referred to as a temperature information signal TI1, and the temperature information signal TI corresponding to the temperature of the print head 22-*i* is referred to as a temperature information signal TIi. That is, the state determination circuit 56 acquires the temperature information signals TI1 to TIn corresponding to the print heads 22-1 to 22-*n*, respectively (Step S20**).

Then, the state determination circuit 56 compares the temperatures of the respective pressure chambers 312 of the print heads 22-1 to **22-*n* as the temperatures of the respective print heads 22-1 to 22-*n* based on the acquired temperature information signals TI1 to TIn with a predetermined threshold temperature Th1**.

Specifically, the variable p is "1", and thus, the state determination circuit 56 determines whether the temperature of the pressure chamber 312 of the print head 22-1 as the temperature of the print head 22-1 based on the temperature information signal TI1 exceeds the predetermined threshold temperature Th1 (step S30). When the state determination circuit 56 determines that the temperature of the pressure chamber 312 of the print head 22-1 as the temperature of the print head 22-1 based on the temperature information signal TI1 exceeds the predetermined threshold temperature Th1 (Y at step S30), the state determination circuit 56 determines that the ink stored in the pressure chamber 312 of the print head 22-1 is short and sets the logic level of the ink supply abnormality flag Fink1 to the H-level (step S40). On the other hand, when the state determination circuit 56 determines that the temperature of the pressure chamber 312 of the print head 22-1 as the temperature of the print head 22-1 based on the temperature information signal TI1 does not exceed the predetermined threshold temperature Th1 (N at step S30), the state determination circuit 56 determines that the ink stored in the pressure chamber 312 of the print head 22-1 is not short, and holds the logic level of the ink supply abnormality flag Fink1 at the L-level.

Then, the state determination circuit 56 determines whether the variable p is less than "n" as the total number of the print heads 22 (step S50), and when the state determination circuit 56 determines that the variable p is less than "n" as the total number of the print heads 22 (Y at step S50), the state determination circuit 56 adds 1 to the variable p and holds the variable as a new variable p (step S60). Then, the variable p is "2", and thus, the state determination circuit 56 determines whether the temperature of the pressure chamber 312 of the print head 22-2 as the temperature of the print head 22-2 based on the temperature information signal TI2 exceeds the predetermined threshold temperature Th1 (step S30).

That is, the state determination circuit 56 repeatedly executes the above described steps S30 to S60. Thereby, the state determination circuit 56 individually determines whether the temperatures of the pressure chambers 312 of the respective print heads 22-1 to 22-*n* as the temperatures of the print heads 22-1 to 22-*n* exceed the predetermined threshold temperature Th1. Then, the state determination circuit 56 individually determines whether the inks stored in the pressure chambers 312 of the print heads 22-1 to 22-*n* are short according to the determination results as to whether the temperatures of the pressure chambers 312 of the print heads 22-1 to 22-*n* exceed the predetermined threshold temperature Th1, and changes the logic levels of the ink supply abnormality flags Fink1 corresponding to the respective print heads 22-1 to 22-*n* according to the determination results.

In other words, the state determination circuit 56 determines that the ink stored in the pressure chamber 312 of the print head 22-1 is short when the temperature information signal TI1 corresponding to the temperature of the pressure chamber 312 of the print head 22-1 as the temperature of the pressure chamber 312 of the print head 22-1 corresponding to the head temperature signal TC output by the print head 22-1 exceeds the predetermined threshold temperature Th1, and determines that the ink stored in the pressure chamber 312 of the print head 22-1 is not short when the temperature information signal TI1 corresponding to the temperature of the pressure chamber 312 of the print head 22-1 as the temperature of the pressure chamber 312 of the print head 22-1 corresponding to the head temperature signal TC output by the print head 22-1 does not exceed the predetermined threshold temperature Th1.

The state determination circuit 56 determines that the ink stored in the pressure chamber 312 of the print head 22-*i* is short when the temperature information signal TIi corresponding to the temperature of the pressure chamber 312 of the print head 22-*i* as the temperature of the pressure chamber 312 of the print head 22-*i* corresponding to the head temperature signal TC output by the print head 22-*i* exceeds the predetermined threshold temperature Th1, and determines that the ink stored in the pressure chamber 312 of the print head 22-*i* is not short when the temperature information signal TIi corresponding to the temperature of the pressure chamber 312 of the print head 22-*i* as the temperature of the pressure chamber 312 of the print head 22-*i* corresponding to the head temperature signal TC output by the print head 22-*i* does not exceed the predetermined threshold temperature Th1.

That is, the liquid ejection apparatus 1 of the embodiment executes a failure diagnostic method of the head unit 20 including determining that the ink stored in the pressure chamber 312 of the print head 22-1 is short when the temperature information signal TI1 corresponding to the temperature of the pressure chamber 312 of the print head 22-1 as the temperature of the pressure chamber 312 of the print head 22-1 corresponding to the head temperature signal TC output by the print head 22-1 exceeds the predetermined threshold temperature Th1, and determining that the ink stored in the pressure chamber 312 of the print head 22-1 is not short when the temperature information signal TI1 corresponding to the temperature of the pressure chamber 312 of the print head 22-1 as the temperature of the pressure chamber 312 of the print head 22-1 corresponding to the head temperature signal TC output by the print head 22-1 does not exceed the predetermined threshold temperature Th1, and further, executes a failure diagnostic method for the head unit 20 including determining that the ink stored in the pressure chamber 312 of the print head 22-*i* (i is one of 2 to n) is short when the temperature information signal TIi corresponding to the temperature of the pressure chamber 312 of the print head 22-*i* as the temperature of the pressure chamber 312 of the print head 22-*i* corresponding to the head temperature signal TC output by the print head 22-*i* exceeds the predetermined threshold temperature Th1, and determining that the ink stored in the pressure chamber 312 of the print head 22-*i* is not short when the temperature information signal TIi corresponding to the temperature of the pressure chamber 312 of the print head 22-*i* as the temperature of the pressure chamber 312 of the print head 22-*i* corresponding to the head temperature signal TC output by the print head 22-*i* does not exceed the predetermined threshold temperature Th1.

When the sufficient ink is stored in the pressure chamber 312, heat generated by driving of the piezoelectric element 60 is conducted to the ink stored in the pressure chamber 312. Then, the ink stored in the pressure chamber 312 is ejected from the nozzle 321 by driving of the piezoelectric element 60, and thereby, the heat conducted to the ink is released. On the other hand, when the sufficient ink is not stored in the pressure chamber 312, the heat generated by driving of the piezoelectric element 60 is accumulated, not conducted to the ink stored in the pressure chamber 312. As a result, the temperature of the piezoelectric element 60 rises, and the detection temperature of the resistance wire 401 formed on the vibrating plate 350 provided with the piezoelectric element 60 rises.

In the liquid ejection apparatus 1 of the embodiment, whether the sufficient ink is stored in the pressure chamber 312, that is, whether the sufficient ink is supplied to the print head 22 is detected based on the rise in the detection temperature of the resistance wire 401. Thereby, the chance of driving of the piezoelectric element 60 without the sufficient liquid stored inside the pressure chamber 312 is reduced, and the chance of abnormality in the piezoelectric element 60 and the vibrating plate 350 is reduced. As a result, the reliability of the head unit 20 including the print heads 22-1 to 22-*n* and the liquid ejection apparatus 1 including the head unit 20 can be increased.

Then, when the state determination circuit 56 determines that the variable p is not less than "n" as the total number of the print heads 22 (N at Step S50), the state determination circuit 56 determines whether all of the temperatures of the pressure chambers 312 of the respective print heads 22-1 to 22-*n* as the temperatures defined by the temperature information signals TI1 to TIn corresponding to the temperatures of the print heads 22-1 to 22-*n* are equal to or more than a predetermined threshold temperature Th2 which is lower than the predetermined threshold temperature Th1 (Step S70).

When the state determination circuit 56 determines that all of the temperatures of the pressure chambers 312 of the respective print heads 22-1 to 22-*n* as the temperatures defined by the temperature information signals TI1 to TIn corresponding to the temperatures of the print heads 22-1 to 22-*n* are not equal to or more than the predetermined threshold temperature Th2 which is lower than the predetermined threshold temperature Th1 (N at Step S70), the state determination circuit 56 determines whether all of the temperatures of the pressure chambers 312 of the respective print heads 22-1 to 22-*n* as the temperatures defined by the temperature information signals TI1 to TIn corresponding to the temperatures of the print heads 22-1 to 22-*n* are less than the predetermined threshold temperature Th2 which is lower than the predetermined threshold temperature Th1 (Step S80).

Here, the predetermined threshold temperature Th2 is set to, for example, a temperature according to the minimum amount of heat generated when the drive signal COM is supplied to the piezoelectric element 60. That is, when the state determination circuit 56 determines that all of the temperatures of the pressure chambers 312 of the respective print heads 22-1 to 22-*n* as the temperatures defined by the temperature information signals TI1 to TIn corresponding to the temperatures of the print heads 22-1 to 22-*n* are equal to or more than the predetermined threshold temperature Th2 which is lower than the predetermined threshold temperature Th1 (Y at step S70), the drive signal COM having the normal signal waveform is supplied to all of the print heads 22-1 to 22-2.

Accordingly, the state determination circuit 56 determines that the drive circuit 50 normally outputs the drive signal COM commonly supplied to the print heads 22-1 to 22-*n*, and determines that the propagation paths through which the drive signals COM supplied to the respective print heads 22-1 to 22-*n* propagate are normal. Therefore, when the state determination circuit 56 determines that all of the temperatures of the pressure chambers 312 of the respective print heads 22-1 to 22-*n* as the temperatures defined by the temperature information signals TI1 to TIn corresponding to the temperatures of the print heads 22-1 to 22-*n* are equal to or more than the predetermined threshold temperature Th2 which is lower than the predetermined threshold temperature Th1, the state determination circuit 56 holds the logic level of the drive signal abnormality flag Fcom at the L-level and holds the logic levels of the COM wiring abnormality flags Fcl1 to Fclp at the L-level.

Further, when the state determination circuit 56 determines that all of the temperatures of the pressure chambers 312 of the print heads 22-1 to 22-*n* as the temperatures defined by the temperature information signals TI1 to TIn corresponding to the temperatures of the print heads 22-1 to 22-*n* are less than the predetermined threshold temperature Th2 which is lower than the predetermined threshold temperature Th1 (step S80), the state determination circuit 56 determines that the drive signal COM commonly supplied to the print heads 22-1 to 22-*n* is abnormal. That is, the state determination circuit 56 determines that the drive circuit 50 does not normally output the drive signal COM commonly supplied to the print heads 22-1 to 22-*n*. Accordingly, the state determination circuit 56 sets the logic level of the drive signal abnormality flag Fcom to the H-level (step S90).

When the state determination circuit 56 determines that all of the temperatures of the pressure chambers 312 of the respective print heads 22-1 to 22-*n* as the temperatures defined by the temperature information signals TI1 to TIn corresponding to the temperatures of the print heads 22-1 to 22-*n* are not equal to or more than the predetermined threshold temperature Th2 which is lower than the predetermined threshold temperature Th1 (N at Step S70) and determines that all of the temperatures of the pressure chambers 312 of the respective print heads 22-1 to 22-*n* as the temperatures defined by the temperature information signals TI1 to TIn corresponding to the temperatures of the print heads 22-1 to 22-*n* are not less than the predetermined threshold temperature Th2 which is lower than the predetermined threshold temperature Th1 (N at Step S80), the state determination circuit 56 determines that the drive signal COM is normally supplied to one of the print heads 22-1 to 22-*n* and the drive signal COM is not normally supplied to another one of the print heads 22-1 to 22-*n*. Accordingly, the state determination circuit 56 determines that an abnormality occurs in one of the propagation paths through which the drive signals COM propagate to the print heads 22-1 to 22-*n*. Then, after initializing the variable p to "1" (step S100), the state determination circuit 56 specifies the propagation path of the drive signal COM with the abnormality.

Specifically, the variable p is "1", and thus, the state determination circuit 56 determines whether the temperature of the pressure chamber 312 of the print head 22-1 as the temperature of the print head 22-1 based on the temperature information signal TI1 is equal to or more than the predetermined threshold temperature Th2 (step S110). Then, when the state determination circuit 56 determines that the temperature of the pressure chamber 312 of the print head 22-1 as the temperature of the print head 22-1 based on the temperature information signal TI1 is equal to or more than the predetermined threshold temperature Th2 (Y at step S110), the state determination circuit 56 determines that the propagation path through which the drive signal COM propagates to the print head 22-1 is normal, and holds the logic level of the COM wiring abnormality flag Fcl1 at the L-level.

On the other hand, when the state determination circuit 56 determines that the temperature of the pressure chamber 312 of the print head 22-1 as the temperature of the print head 22-1 based on the temperature information signal TI1 is less than the predetermined threshold temperature Th2 (Y at step S110), the state determination circuit 56 determines that the propagation path through which the drive signal COM propagates to the print head 22-1 is abnormal, and sets the logic level of the COM wiring abnormality flag Fcl1 to the H-level.

Then, the state determination circuit 56 determines whether the variable p is less than "n" as the total number of the print heads 22 (step S130), and when the state determination circuit 56 determines that the variable p is less than "n" as the total number of the print heads 22 (Y at step S130), the state determination circuit 56 adds 1 to the variable p and holds the variable as a new variable p (step S140). Then, the variable p is "2", and thus, the state determination circuit 56 determines whether the temperature of the pressure chamber 312 of the print head 22-2 as the temperature of the print head 22-2 based on the temperature information signal TI2 is equal to or more than the predetermined threshold temperature Th2 (step S110).

That is, the state determination circuit 56 repeatedly executes the above described steps S110 to S140. Thereby, the state determination circuit 56 individually determines whether the temperatures of the pressure chambers 312 of the respective print heads 22-1 to **22-*n* as the temperatures of the print heads 22-1 to 22-*n* are equal to or more than the predetermined threshold temperature Th2. Then, the state determination circuit 56 determines whether an abnormality occurs in the propagation paths through which the drive signals COM propagate to the respective print heads 22-1 to 22-*n* according to the determination results as to whether the temperatures of the pressure chambers 312 of the print heads 22-1 to 22-*n* are equal to or more than the predetermined threshold temperature Th2, and changes the logic level of the COM wiring abnormality flag Fcl1** according to the determination results.

Specifically, the state determination circuit 56 of the embodiment determines that an abnormality occurs in the propagation path through which the drive signal COM propagates to the print head 22-1, when the temperature of the pressure chamber 312 of the print head 22-1 corresponding to the head temperature signal TC output by the print head 22-1 as the temperature information signal TI1 corresponding to the temperature of the pressure chamber 312 of the print head 22-1 is less than the predetermined threshold temperature Th2 which is lower than the predetermined threshold temperature Th1 and the temperature of the pressure chamber 312 of the print head **22-*i* (i is one of 2 to n) corresponding to the head temperature signal TC output by the print head 22-*i* as the temperature information signal TIi corresponding to the temperature of the pressure chamber 312 of the print head 22-*i* is equal to or more than the predetermined threshold temperature Th2**.

That is, the liquid ejection apparatus 1 of the embodiment executes a failure diagnostic method for the head unit 20 including determining that an abnormality occurs in the propagation path through which the drive signal COM propagates to the print head 22-1, when the temperature of the pressure chamber 312 of the print head 22-1 corresponding to the head temperature signal TC output by the print head 22-1 as the temperature information signal TI1 corresponding to the temperature of the pressure chamber 312 of the print head 22-1 is less than the predetermined threshold temperature Th2 and the temperature of the pressure chamber 312 of the print head **22-*i* (i is one of 2 to n) corresponding to the head temperature signal TC output by the print head 22-*i* as the temperature information signal TIi corresponding to the temperature of the pressure chamber 312 of the print head 22-*i* is equal to or more than the predetermined threshold temperature Th2**.

As described above, in the liquid ejection apparatus 1 of the embodiment, the state determination circuit 56 determines whether the drive signal COM is supplied to the print heads 22-1 to **22-*n* based on the respective temperatures of the print heads 22-1 to 22-*n*. Here, in the liquid ejection apparatus 1 of the embodiment, since the temperature detection circuit 250 is individually provided for the print head 22, the temperature of each of the print heads 22-1 to 22-*n* can be individually acquired. That is, the state determination circuit 56 can individually determine whether the drive signal COM is supplied to the print heads 22-1 to 22-*n* based on the temperature of each of the print heads 22-1 to 22-*n*. Thereby, in addition to whether the drive signal COM is supplied to the print heads 22-1 to 22-*n*, when an abnormality occurs in the drive signal COM supplied to the print heads 22-1 to 22-*n*, whether the abnormality is caused by the drive circuit 50 that outputs the drive signal COM or caused by the propagation path through which the drive signal COM propagates can be determined. Accordingly, the reliability of the liquid ejection apparatus 1** can be further increased.

Then, when the state determination circuit 56 determines that all of the temperatures of the pressure chambers 312 of the respective print heads 22-1 to **22-*n* as the temperatures defined by the temperature information signals TI1 to TIn corresponding to the temperatures of the print heads 22-1 to 22-*n* are equal to or more than the predetermined threshold temperature Th2 which is lower than the predetermined threshold temperature Th1 (Y at step S70), after the state determination circuit 56 sets the logic level of the drive signal abnormality flag Fcom to the H-level, or when the state determination circuit 56 determines that the variable p is not less than "n" as the total number of the print heads 22 (Y at step S130), the state determination circuit 56 generates the state signal SS according to the logic levels of the ink supply abnormality flags Fink1 to Finkn, the logic levels of the COM wiring abnormality flags Fcl1 to Fcln, and the logic level of the drive signal abnormality flag Fcom, and outputs the state signal SS to the control circuit 100 (step S150**).

The control circuit 100 grasps the states of the print heads 22-1 to **22-*n* according to the logic levels of the ink supply abnormality flags Fink1 to Finkn, the logic levels of the COM wiring abnormality flags Fcl1** to Fcln, and the logic level of the drive signal abnormality flag Fcom, which are grasped from the input state signal SS.

Then, the control circuit 100 stops the operation of the print head 22 with the abnormality grasped based on the state signal SS among the print heads 22-1 to **22-*n*, supplements the print head 22 stopped operating with the other print head 22**, and notifies the user of the abnormality.

That is, when the state determination circuit 56 determines that the liquid stored in the pressure chamber 312 of the print head 22-1 is short and determines that the liquid stored in the pressure chamber 312 of the print head **22-*i* is not short, the control circuit 100 controls the print head 22-1 not to eject the ink and controls the print head 22-*i* to operate to supplement the print head 22-1, and further, notifies the user of the abnormality of the print head 22-1 via the notification circuit 94. When the state determination circuit 56 determines that an abnormality occurs in the propagation path through which the drive signal COM propagates to the print head 22-1 and determines that an abnormality does not occur in the propagation path through which the drive signal COM propagates to the print head 22-*i*, the control circuit 100 controls the print head 22-1 not to eject the ink and controls the print head 22-*i* to operate to supplement the print head 22-*i*, and further, notifies the user of the abnormality of the print head 22-1 via the notification circuit 94**.

Thereby, even when an abnormality occurs in one of the print heads 22-1 to **22-*n*, the liquid ejection apparatus 1 can continue the operation and the reliability of the liquid ejection apparatus 1 can be increased. Further, the apparatus may prompt appropriate handling of the abnormality by notifying the user of the abnormality, and thereby, the reliability of the liquid ejection apparatus 1** can be further increased.

In the viewpoint that the drive signal COM is an example of the drive signal and the drive signal VOUT is generated by selection or deselection of the signal waveform control of the drive signal COM, the drive signal VOUT is also an example of the drive signal. The print head 22-1 is an example of a first print head, the head temperature signal TC1 output by the print head 22-1 is an example of a first temperature signal, the head temperature information tc1 contained in the head temperature signal TC1 is an example of first temperature information, the electrode 360 contained in the print head 22-1 is an example of a first electrode, the electrode 380 is an example of a second electrode, the piezoelectric material 370 is an example of a first piezoelectric material, the piezoelectric element 60 is an example of a first piezoelectric element, the vibrating plate 350 is an example of a first vibrating plate, the pressure chamber 312 is an example of a first pressure chamber, the pressure chamber substrate 310 is an example of a first pressure chamber substrate, the nozzle 321 is an example of a first nozzle, the temperature detection circuit 250 and the resistance wire 401 are an example of a first temperature detection unit, and the direction along the Z-axis in which the electrode 360, the piezoelectric material 370, and the electrode 380 are stacked is an example of a first stacking direction. The print head 22-*i* is an example of a second print head. The head temperature signal TCi output by the print head 22-*i* is an example of a second temperature signal, the head temperature information tci contained in the head temperature signal TCi is an example of second temperature information, the electrode 360 contained in the print head 22-*i* is an example of a third electrode, the electrode 380 is an example of a fourth electrode, the piezoelectric material 370 is an example of a second piezoelectric material, the piezoelectric element 60 is an example of a second piezoelectric element, the vibrating plate 350 is an example of a second vibrating plate, the pressure chamber 312 is an example of a second pressure chamber, the pressure chamber substrate 310 is an example of a second pressure chamber substrate, the nozzle 321 is an example of a second nozzle, the temperature detection circuit 250 and the resistance wire 401 are an example of a second temperature detection unit, and the direction along the Z-axis in which the electrode 360, the piezoelectric material 370, and the electrode 380 are stacked is an example of a second stacking direction. The predetermined threshold temperature Th1 is an example of a first predetermined value, and the predetermined threshold temperature Th2 is an example of a second predetermined value. The notification circuit 94 is an example of a notification unit.

3. Functions and Effects

As described above, in the liquid ejection apparatus 1 of the embodiment, the state determination circuit 56 can individually detect whether the sufficient inks are stored in the pressure chambers 312 of the respective print heads 22-1 to 22-*n*, that is, whether the sufficient inks are supplied to the print heads 22-1 to 22-*n* based on the rise of the detection temperature in the resistance wire 401 formed on the vibrating plates 350 of the respective print heads 22-1 to 22-*n*. Thereby, the chance of driving of the piezoelectric element 60 without the sufficient liquid stored inside the pressure chamber 312 is reduced, and the chance of abnormality in the piezoelectric element 60 and the vibrating plate 350 is reduced. As a result, the reliability of the head unit 20 including the print heads 22-1 to 22-*n* and the liquid ejection apparatus 1 including the head unit 20 can be increased.

In the liquid ejection apparatus 1 of the embodiment, the state determination circuit 56 determines whether the drive signal COM is supplied to the print heads 22-1 to 22-*n* based on the temperatures of the respective print heads 22-1 to 22-*n*. Here, in the liquid ejection apparatus 1 of the embodiment, since the temperature detection circuit 250 is individually provided for the print head 22, the temperature of each of the print heads 22-1 to 22-*n* can be individually acquired. That is, the state determination circuit 56 of the liquid ejection apparatus 1 of the embodiment can individually determine whether the drive signal COM is supplied to the print heads 22-1 to 22-*n* based on the temperatures of the respective print heads 22-1 to 22-*n*. Thereby, in addition to whether the drive signal COM is supplied to the print heads 22-1 to 22-*n*, when an abnormality occurs in the drive signal COM supplied to the print heads 22-1 to 22-*n*, whether the abnormality is caused by the drive circuit 50 that outputs the drive signal COM or caused by the propagation path through which the drive signal COM propagates can be determined. Accordingly, the reliability of the liquid ejection apparatus 1 can be further increased.

Although the embodiments and the modified examples are described above, the present disclosure is not limited to the embodiments and can be implemented in various aspects without departing from the gist thereof. For example, the above described embodiments can be appropriately combined.

The present disclosure includes substantially the same configurations as the configurations described in the embodiments, for example, configurations having the same functions, methods, and results and configurations having the same purposes and effects. Further, the present disclosure includes configurations in which non-essential portions of the configurations described in the embodiments are replaced. Furthermore, the present disclosure includes configurations that can exert the same functions and effects or configurations that can achieve the same purposes as those of the configurations described in the embodiments. In addition, the present disclosure includes configurations obtained by addition of known techniques to the configurations described in the embodiments.

The following configurations are derived from the above described embodiments.

A configuration of a liquid ejection apparatus includes a drive circuit outputting a drive signal corrected based on a temperature information signal, a first print head receiving the drive signal and ejecting a liquid, a temperature information output circuit acquiring a first temperature signal indicating a temperature of the first print head and outputting the temperature information signal based on the first temperature signal, and a state determination circuit determining a state of the first print head based on the temperature information signal, wherein the first print head includes a first piezoelectric element including a first electrode, a second electrode, and a first piezoelectric material, the first piezoelectric material being positioned between the first electrode and the second electrode in a first stacking direction in which the first electrode, the second electrode, and the first piezoelectric material are stacked, and receiving the drive signal and being driven, a first vibrating plate located at one side in the first stacking direction with respect to the first piezoelectric element and deformed by driving of the first piezoelectric element, and a first pressure chamber substrate provided with a first pressure chamber located at one side in the first stacking direction with respect to the first vibrating plate, storing the liquid, and having a volume that changes by deformation of the first vibrating plate, a first nozzle ejecting the liquid in response to a change of the volume of the first pressure chamber, and a first temperature detection unit located at the other side in the first stacking direction with respect to the first vibrating plate, acquiring first temperature information corresponding to a temperature of the first pressure chamber, and outputting the information as the first temperature signal, and the state determination circuit determines that the liquid stored in the first pressure chamber is short when the temperature of the first pressure chamber corresponding to the first temperature signal exceeds a first predetermined value, and determines that the liquid is not short when the temperature of the first pressure chamber corresponding to the first temperature signal does not exceed the first predetermined value.

According to the liquid ejection apparatus, whether the pressure chamber is filled with the liquid can be detected based on the temperature rise of the temperature detection unit, and the reliability of the liquid ejection apparatus can be increased.

In the configuration of the liquid ejection apparatus, a second print head receiving the drive signal and ejecting the liquid is provided, and the temperature information output circuit acquires a second temperature signal indicating a temperature of the second print head and outputs the temperature information signal based on the first temperature signal and the second temperature signal, the second print head includes a second piezoelectric element including a third electrode, a fourth electrode, and a second piezoelectric material, the second piezoelectric material positioned between the third electrode and the fourth electrode in a second stacking direction in which the third electrode, the fourth electrode, and the second piezoelectric material are stacked, and receiving the drive signal and being driven, a second vibrating plate located at one side in the second stacking direction with respect to the second piezoelectric element and deformed by driving of the second piezoelectric element, and a second pressure chamber substrate provided with a second pressure chamber located at one side in the second stacking direction with respect to the second vibrating plate, storing the liquid, and having a volume that changes by deformation of the second vibrating plate, a second nozzle ejecting the liquid in response to a change of the volume of the second pressure chamber, and a second temperature detection unit located at the other side in the second stacking direction with respect to the second vibrating plate, acquiring second temperature information corresponding to a temperature of the second pressure chamber, and outputting the information as the second temperature signal, and the state determination circuit may determine that the liquid stored in the second pressure chamber is short when the temperature of the second pressure chamber corresponding to the second temperature signal exceeds the first predetermined value, and determine that the liquid stored in the second pressure chamber is not short when the temperature of the second pressure chamber corresponding to the second temperature signal does not exceed the first predetermined value.

According to the liquid ejection apparatus, when a plurality of print heads are provided, whether the pressure chamber is filled with the liquid may be detected based on the temperature rise of the temperature detection unit for each of the plurality of print heads, and the reliability of the liquid ejection apparatus can be further increased.

In the configuration of the liquid ejection apparatus, when the state determination circuit determines that the liquid stored in the first pressure chamber is short and determines that the liquid stored in the second pressure chamber is not short, the first print head may not eject the liquid, and the second print head may supplement the first print head.

According to the liquid ejection apparatus, even when the liquid is not stored in one print head, the ejection of the liquid may be continued using the other print head. Thereby, the chance of an inappropriate stoppage of the liquid ejection apparatus may be reduced.

In the configuration of the liquid ejection apparatus, a notification unit is provided, and the notification unit may give a notification of an abnormality of the first print head when the state determination circuit determines that the liquid stored in the first pressure chamber is short and determines that the liquid stored in the second pressure chamber is not short.

According to the liquid ejection apparatus, a user may be prompted to perform appropriate maintenance.

In the configuration of the liquid ejection apparatus, when the temperature of the first pressure chamber corresponding to the first temperature signal is less than a second predetermined value which is lower than the first predetermined value and the temperature of the second pressure chamber corresponding to the second temperature signal is equal to or more than the second predetermined value, the state determination circuit may determine that an abnormality occurs in a propagation path through which the drive signal propagates to the first print head.

According to the liquid ejection apparatus, whether the piezoelectric element is driven may be determined in response to the temperature change, and the abnormality of the propagation path through which the drive signal propagates can be specified because the temperature of only one of the plurality of print heads does not rise. Thereby, the reliability of the liquid ejection apparatus can be further increased.

In the configuration of the liquid ejection apparatus, when the state determination circuit determines that an abnormality occurs in the propagation path through which the drive signal propagates to the first print head, the first print head may not eject the liquid, and the second print head may supplement the first print head.

According to the liquid ejection apparatus, even when the liquid is not stored in one print head, the ejection of the liquid can be continued using the other print head. Thereby, the chance of an inappropriate stoppage of the liquid ejection apparatus may be reduced.

In the configuration of the liquid ejection apparatus, a notification unit is provided, and the notification unit may give a notification of an abnormality of the propagation path when the state determination circuit determines that the abnormality occurs in the propagation path.

According to the liquid ejection apparatus, a user may be prompted to perform appropriate maintenance.

A configuration of a failure diagnostic method for a head unit is a failure diagnostic method for a head unit including a first print head having a first piezoelectric element including a first electrode, a second electrode, and a first piezoelectric material, the first piezoelectric material being positioned between the first electrode and the second electrode in a first stacking direction in which the first electrode, the second electrode, and the first piezoelectric material are stacked, and receiving the drive signal and being driven, a first vibrating plate located at one side in the first stacking direction with respect to the first piezoelectric element and deformed by driving of the first piezoelectric element, and a first pressure chamber substrate provided with a first pressure chamber located at one side in the first stacking direction with respect to the first vibrating plate, storing the liquid, and having a volume that changes by deformation of the first vibrating plate, a first nozzle ejecting the liquid in response to a change of the volume of the first pressure chamber, and a first temperature detection unit located at the other side in the first stacking direction with respect to the first vibrating plate, acquiring first temperature information corresponding to a temperature of the first pressure chamber, and outputting the information as the first temperature signal, including determining that the liquid stored in the first pressure chamber is short when the temperature of the first pressure chamber corresponding to the first temperature signal exceeds a first predetermined value, and determining that the liquid is not short when the temperature of the first pressure chamber corresponding to the first temperature signal does not exceed the first predetermined value.

According to the failure diagnostic method for the head unit, whether the pressure chamber is filled with the liquid can be detected based on the temperature rise of the temperature detection unit, and the reliability of the head unit can be increased.

In the configuration of the failure diagnostic method for the head unit, the head unit includes a second print head having a second piezoelectric element including a third electrode, a fourth electrode, and a second piezoelectric material, the second piezoelectric material being positioned between the third electrode and the fourth electrode in a second stacking direction in which the third electrode, the fourth electrode, and the second piezoelectric material are stacked, and receiving the drive signal and being driven, a second vibrating plate located at one side in the second stacking direction with respect to the second piezoelectric element and deformed by driving of the second piezoelectric element, and a second pressure chamber substrate provided with a second pressure chamber located at one side in the second stacking direction with respect to the second vibrating plate, storing the liquid, and having a volume that changes by deformation of the second vibrating plate, a second nozzle ejecting the liquid in response to a change of the volume of the second pressure chamber, and a second temperature detection unit located at the other side in the second stacking direction with respect to the second vibrating plate, acquiring second temperature information corresponding to a temperature of the second pressure chamber, and outputting the information as a second temperature signal, and the method includes determining that the liquid stored in the second pressure chamber is short when the temperature of the second pressure chamber corresponding to the second temperature signal exceeds the first predetermined value, and determining that the liquid stored in the second pressure chamber is not short when the temperature of the second pressure chamber corresponding to the second temperature signal does not exceed the first predetermined value.

According to the failure diagnostic method for the head unit, when the plurality of print heads are provided, whether the pressure chamber is filled with the liquid can be detected based on the temperature rise of the temperature detection unit for each of the plurality of print heads, and the reliability of the head unit can be further increased.

The configuration of the failure diagnostic method for the head unit may further include determining that an abnormality occurs in a propagation path through which the drive signal propagates to the first print head when the temperature of the first pressure chamber corresponding to the first temperature signal is less than a second predetermined value which is lower than the first predetermined value and the temperature of the second pressure chamber corresponding to the second temperature signal is equal to or more than the second predetermined value.

According to the failure diagnostic method for the head unit, whether the piezoelectric element is driven in response to the temperature change can be determined, and the abnormality of the propagation path through which the drive signal propagates can be specified because the temperature of only one of the plurality of print heads does not rise. Accordingly, the reliability of the head unit can be further increased.

What is claimed is:

1. A liquid ejection apparatus comprising:

a drive circuit outputting a drive signal corrected based on a temperature information signal;

a first print head receiving the drive signal and ejecting a liquid;

a temperature information output circuit acquiring a first temperature signal indicating a temperature of the first print head and outputting the temperature information signal based on the first temperature signal; and a state determination circuit determining a state of the first print head based on the temperature information signal, wherein the first print head includes a first piezoelectric element including a first electrode, a second electrode, and a first piezoelectric material, the first piezoelectric material being positioned between the first electrode and the second electrode in a first stacking direction in which the first electrode, the second electrode, and the first piezoelectric material are stacked, and receiving the drive signal and being driven, a first vibrating plate located at one side in the first stacking direction with respect to the first piezoelectric element and deformed by driving of the first piezoelectric element, a first pressure chamber substrate provided with a first pressure chamber located at one side in the first stacking direction with respect to the first vibrating plate, storing the liquid, and having a volume that changes by deformation of the first vibrating plate, a first nozzle ejecting the liquid in response to a change of the volume of the first pressure chamber, and a first temperature detection unit located at the other side in the first stacking direction with respect to the first vibrating plate, acquiring first temperature information corresponding to a temperature of the first pressure chamber, and outputting the information as the first temperature signal, and the state determination circuit determines that the liquid stored in the first pressure chamber is short when the temperature of the first pressure chamber corresponding to the first temperature signal exceeds a first predetermined value, and determines that the liquid stored in the first pressure chamber is not short when the temperature of the first pressure chamber corresponding to the first temperature signal does not exceed the first predetermined value.

2. The liquid ejection apparatus according to claim 1, further comprising a second print head receiving the drive signal and ejecting the liquid, wherein the temperature information output circuit acquires a second temperature signal indicating a temperature of the second print head and outputs the temperature information signal based on the first temperature signal and the second temperature signal, the second print head includes a second piezoelectric element including a third electrode, a fourth electrode, and a second piezoelectric material, the second piezoelectric material positioned between the third electrode and the fourth electrode in a second stacking direction in which the third electrode, the fourth electrode, and the second piezoelectric material are stacked, and receiving the drive signal and being driven, a second vibrating plate located at one side in the second stacking direction with respect to the second piezoelectric element and deformed by driving of the second piezoelectric element, a second pressure chamber substrate provided with a second pressure chamber located at one side in the second stacking direction with respect to the second vibrating plate, storing the liquid, and having a volume that changes by deformation of the second vibrating plate, a second nozzle ejecting the liquid in response to a change of the volume of the second pressure chamber, and a second temperature detection unit located at the other side in the second stacking direction with respect to the second vibrating plate, acquiring second temperature information corresponding to a temperature of the second pressure chamber, and outputting the information as the second temperature signal, and the state determination circuit determines that the liquid stored in the second pressure chamber is short when the temperature of the second pressure chamber corresponding to the second temperature signal exceeds the first predetermined value, and determines that the liquid stored in the second pressure chamber is not short when the temperature of the second pressure chamber corresponding to the second temperature signal does not exceed the first predetermined value.

3. The liquid ejection apparatus according to claim 2, wherein, when the state determination circuit determines that the liquid stored in the first pressure chamber is short and determines that the liquid stored in the second pressure chamber is not short, the first print head does not eject the liquid, and the second print head supplements the first print head.

4. The liquid ejection apparatus according to claim 3, further comprising a notification unit, wherein the notification unit gives a notification of an abnormality of the first print head when the state determination circuit determines that the liquid stored in the first pressure chamber is short and determines that the liquid stored in the second pressure chamber is not short.

5. The liquid ejection apparatus according to claim 2, wherein, when the temperature of the first pressure chamber corresponding to the first temperature signal is less than a second predetermined value which is lower than the first predetermined value and the temperature of the second pressure chamber corresponding to the second temperature signal is equal to or more than the second predetermined value, the state determination circuit determines that an abnormality occurs in a propagation path through which the drive signal propagates to the first print head.

6. The liquid ejection apparatus according to claim 5, wherein, when the state determination circuit determines that an abnormality occurs in the propagation path through which the drive signal propagates to the first print head, the first print head does not eject the liquid, and the second print head supplements the first print head.

7. The liquid ejection apparatus according to claim 6, further comprising a notification unit, wherein the notification unit gives a notification of the abnormality of the propagation path, when the state determination circuit determines that the abnormality occurs in the propagation path.

8. A failure diagnostic method for a head unit including a first print head having a first piezoelectric element including a first electrode, a second electrode, and a first piezoelectric material, the first piezoelectric material being positioned between the first electrode and the second electrode in a first stacking direction in which the first electrode, the second electrode, and the first piezoelectric material are stacked, and receiving the drive signal and being driven, a first vibrating plate located at one side in the first stacking direction with respect to the first piezoelectric element and deformed by driving of the first piezoelectric element, a first pressure chamber substrate provided with a first pressure chamber located at one side in the first stacking direction with respect to the first vibrating plate, storing the liquid, and having a volume that changes by deformation of the first vibrating plate, a first nozzle ejecting the liquid in response to a change of the volume of the first pressure chamber, and a first temperature detection unit located at the other side in the first stacking direction with respect to the first vibrating plate, acquiring first temperature information corresponding to a temperature of the first pressure chamber, and outputting the information as the first temperature signal, the method comprising:

determining that the liquid stored in the first pressure chamber is short when the temperature of the first pressure chamber corresponding to the first temperature signal exceeds a first predetermined value; and determining that the liquid stored in the first pressure chamber is not short when the temperature of the first pressure chamber corresponding to the first temperature signal does not exceed the first predetermined value.

9. The failure diagnostic method for a head unit according to claim 8, the head unit including a second print head having a second piezoelectric element including a third electrode, a fourth electrode, and a second piezoelectric material, the second piezoelectric material being positioned between the third electrode and the fourth electrode in a second stacking direction in which the third electrode, the fourth electrode, and the second piezoelectric material are stacked, and receiving the drive signal and being driven, a second vibrating plate located at one side in the second stacking direction with respect to the second piezoelectric element and deformed by driving of the second piezoelectric element, a second pressure chamber substrate provided with a second pressure chamber located at one side in the second stacking direction with respect to the second vibrating plate, storing the liquid, and having a volume that changes by deformation of the second vibrating plate, a second nozzle ejecting the liquid in response to a change of the volume of the second pressure chamber, and a second temperature detection unit located at the other side in the second stacking direction with respect to the second vibrating plate, acquiring second temperature information corresponding to a temperature of the second pressure chamber, and outputting the information as a second temperature signal, the method further comprising:

determining that the liquid stored in the second pressure chamber is short when the temperature of the second pressure chamber corresponding to the second temperature signal exceeds the first predetermined value; and determining that the liquid stored in the second pressure chamber is not short when the temperature of the second pressure chamber corresponding to the second temperature signal does not exceed the first predetermined value.

10. The failure diagnostic method for a head unit according to claim 9, further comprising determining that an abnormality occurs in a propagation path through which the drive signal propagates to the first print head when a temperature of the first pressure chamber corresponding to the first temperature signal is less than a second predetermined value which is lower than the first predetermined value and a temperature of the second pressure chamber corresponding to the second temperature signal is equal to or more than the second predetermined value.

* * * * *